(12) United States Patent
Saunders et al.

(10) Patent No.: US 8,387,873 B2
(45) Date of Patent: *Mar. 5, 2013

(54) SYSTEM AND METHOD FOR MASS TRANSIT MERCHANT PAYMENT

(75) Inventors: Peter D. Saunders, Salt Lake City, UT (US); Lee J. Peart, Epsom (GB); Brian T. Barnes, South Jordan, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,334

(22) Filed: Aug. 12, 2011

(65) Prior Publication Data

US 2011/0302081 A1 Dec. 8, 2011

Related U.S. Application Data

(63) Continuation of application No. 12/768,900, filed on Apr. 28, 2010, now Pat. No. 8,025,223, which is a continuation of application No. 11/423,388, filed on Jun. 9, 2006, now Pat. No. 7,731,086.

(60) Provisional application No. 60/689,300, filed on Jun. 10, 2005, provisional application No. 60/762,011, filed on Jan. 24, 2006.

(51) Int. Cl.
*G06K 5/00* (2006.01)

(52) U.S. Cl. ........................................................ 235/382

(58) Field of Classification Search .................. 235/380, 235/382, 384, 492, 375, 379
See application file for complete search history.

(56) References Cited

U.S. PATENT DOCUMENTS

| | | | |
|---|---|---|---|
| 5,740,246 A * | 4/1998 | Saito | 705/52 |
| 5,828,044 A | 10/1998 | Jun et al. | |
| 5,857,152 A | 1/1999 | Everett | |
| 6,070,146 A | 5/2000 | Mimata | |
| 6,119,096 A * | 9/2000 | Mann et al. | 705/5 |
| 6,732,922 B2 | 5/2004 | Lindgren et al. | |
| 6,744,369 B2 * | 6/2004 | Sata | 340/573.1 |
| 6,744,383 B1 * | 6/2004 | Alfred et al. | 340/988 |
| 7,254,557 B1 * | 8/2007 | Gillin et al. | 705/40 |
| 7,331,522 B2 | 2/2008 | Sandoval et al. | |
| 7,566,003 B2 | 7/2009 | Silbernagl et al. | |
| 2002/0194137 A1 | 12/2002 | Park et al. | |
| 2003/0001755 A1 | 1/2003 | Tiernay et al. | |
| 2005/0216405 A1 | 9/2005 | So | |
| 2006/0278704 A1 | 12/2006 | Saunders et al. | |
| 2008/0156873 A1 * | 7/2008 | Wilhelm et al. | 235/384 |

FOREIGN PATENT DOCUMENTS

WO 2006124808 11/2006

OTHER PUBLICATIONS

USPTO; Notice of Allowance dated Feb. 2, 2010 in U.S. Appl. No. 11/423,388.
USPTO; Office Action dated Sep. 1, 2009 in U.S. Appl. No. 11/423,388.
USPTO; Notice of Allowance dated May 27, 2011 in U.S. Appl. No. 12/769,900.
USPTO; Office Action dated Mar. 7, 2011 in U.S. Appl. No. 12/769,900.

(Continued)

*Primary Examiner* — Seung Lee
(74) *Attorney, Agent, or Firm* — Snell & Wilmer L.L.P.

(57) ABSTRACT

Methods, systems and computer program products are provided for enabling payment of transit system fees using a financial transaction instrument. Entry is permitted onto a transit system by recognition of information included in an identification number stored on a financial transaction instrument. The identification number stored on the financial transaction instrument is associated with a transit system fee registered for each use of the transit system. A plurality of transit system fees associated with the same identification number from use of the financial transaction instrument is aggregated, and payment for the aggregated transit system fees is requested from a transaction account associated with the financial transaction instrument.

19 Claims, 13 Drawing Sheets

OTHER PUBLICATIONS

Examiner's Report dated Apr. 26, 2012 in Australian Application No. 2008340301.

International Preliminary Report on Patentability dated Mar. 17, 2009 in Application No. PCT/US2006/022512.

PCT, Int'l Search Report and Written Opinion, PCT/US06/22542 dated Jan. 29, 2008.

International Search Report and Written Opinion of the International Searching Authority, PCT/US2008/086970, Feb. 6, 2009.

"Transit and Contactless Financial Payments: New Opportunities for Collaboration and Convergence", Smart Card Alliance, Mar. 7, 2007.

"Performance of a Pilot Test of Contactless Banking Devices on Path and NJ Transit", The Port Authority of NY & NJ, Request for Proposal, Jan. 18, 2007.

PCT; International Preliminary Report on Patentability dated Jun. 22, 2010 in Application No. PCT/US2008/0086970.

"Gernalto to Provide 3.5 Million Transit Payment Devices to Massachusetts Bay Transportation Authority", Smart Card Alliance, Mar. 7, 2007.

USPTO; Office Action dated May 5, 2010 in U.S. Appl. No. 12/273,738.

USPTO; Final Office Action dated Sep. 14, 2010 in U.S. Appl. No. 12/273,738.

USPTO; Advisory Action dated Oct. 12, 2010 in U.S. Appl. No. 12/273,738.

USPTO; Office Action dated Nov. 16, 2010 in U.S. Appl. No. 12/273,738.

USPTO; Final Office Action dated Apr. 20, 2011 in U.S. Appl. No. 12/273,738.

USPTO; Advisory Action dated Jun. 29, 2011 in U.S. Appl. No. 12/273,738.

USPTO; Notice of Allowance dated Oct. 3, 2011 in U.S. Appl. No. 12/273,738.

* cited by examiner

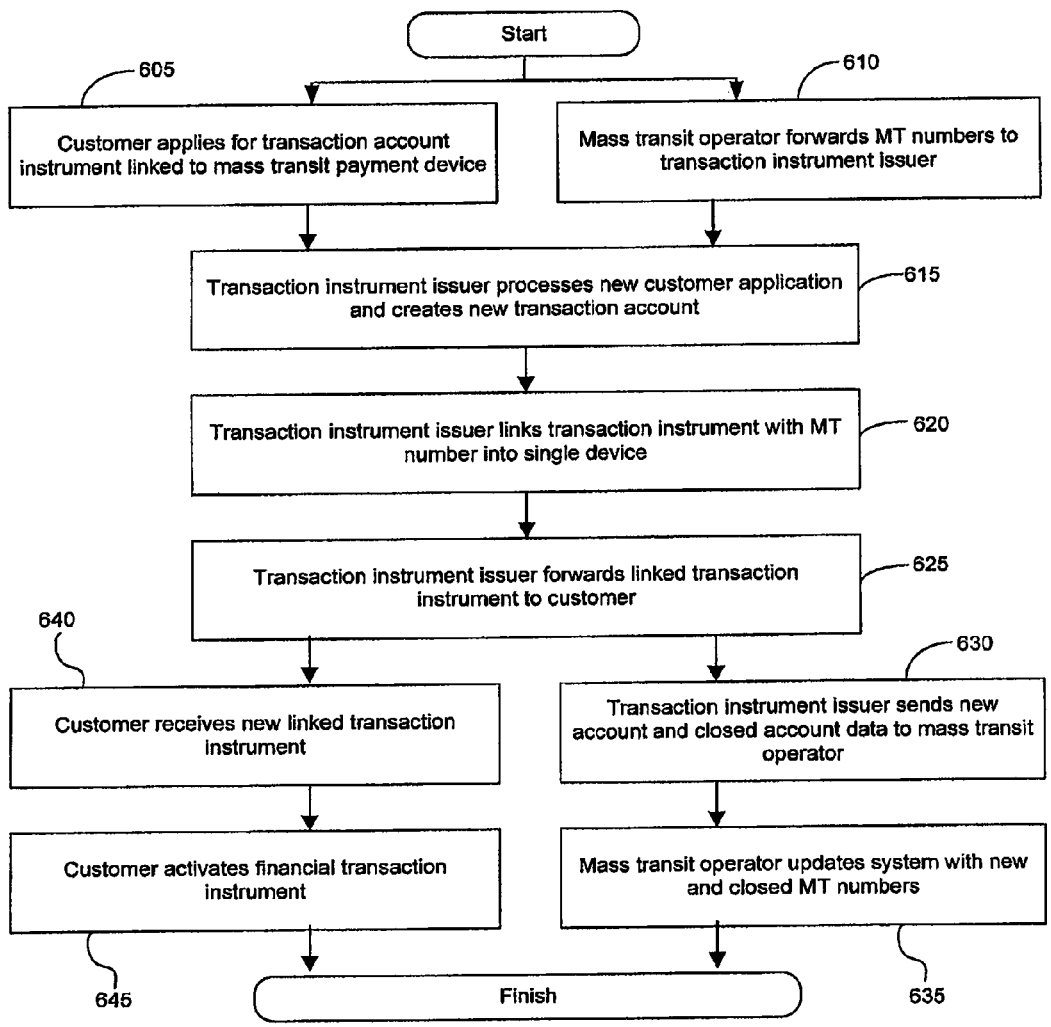

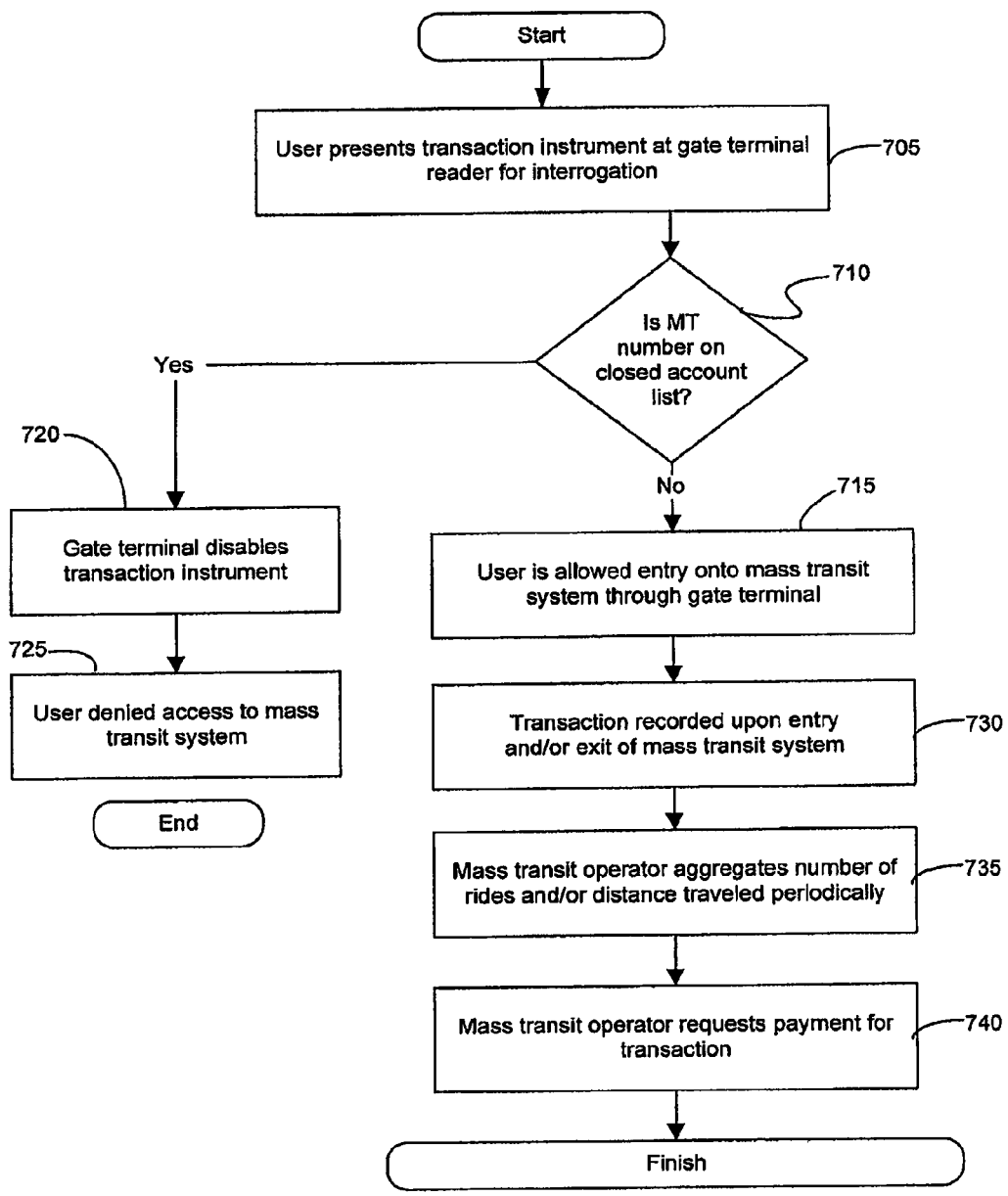

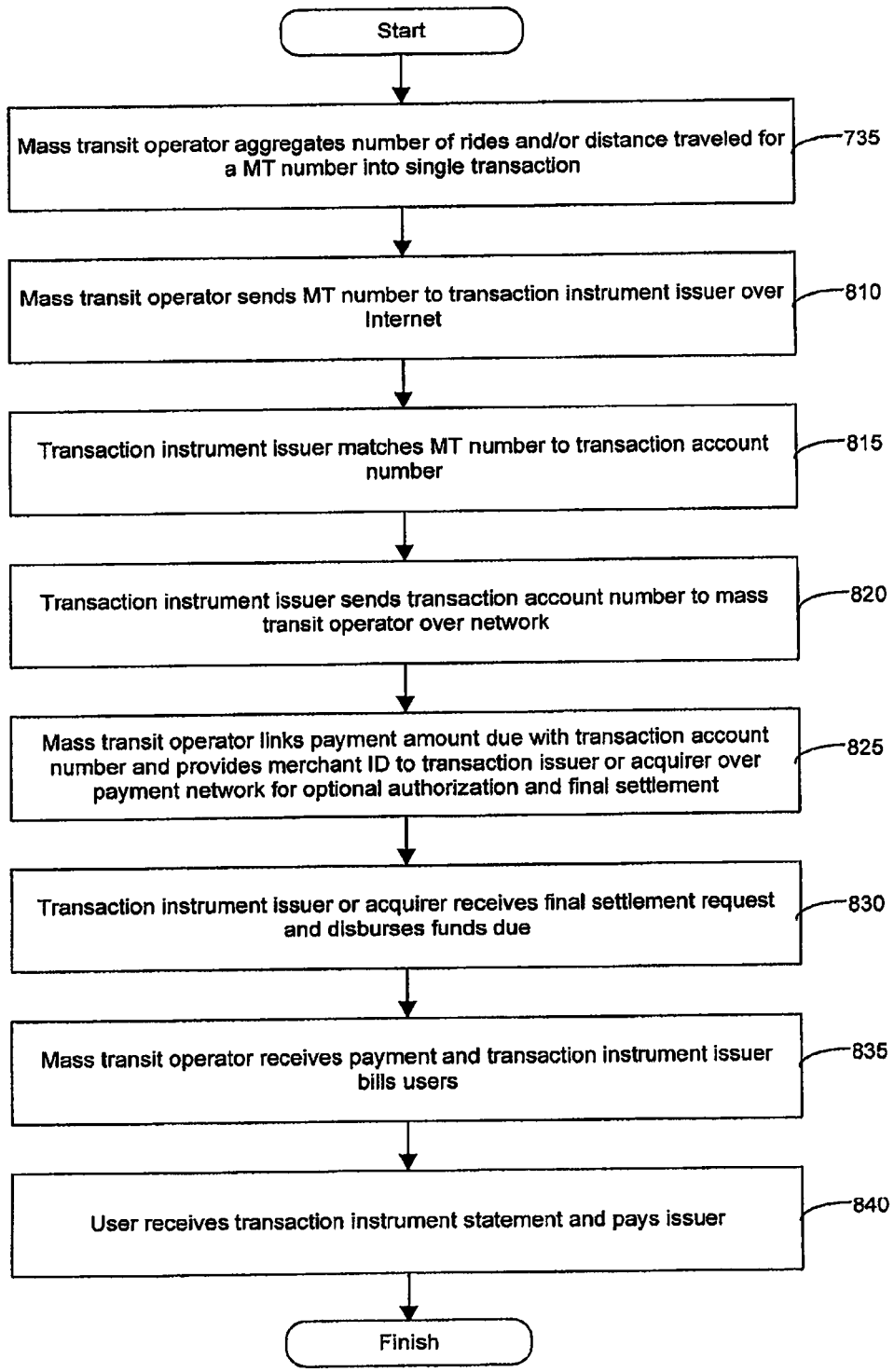

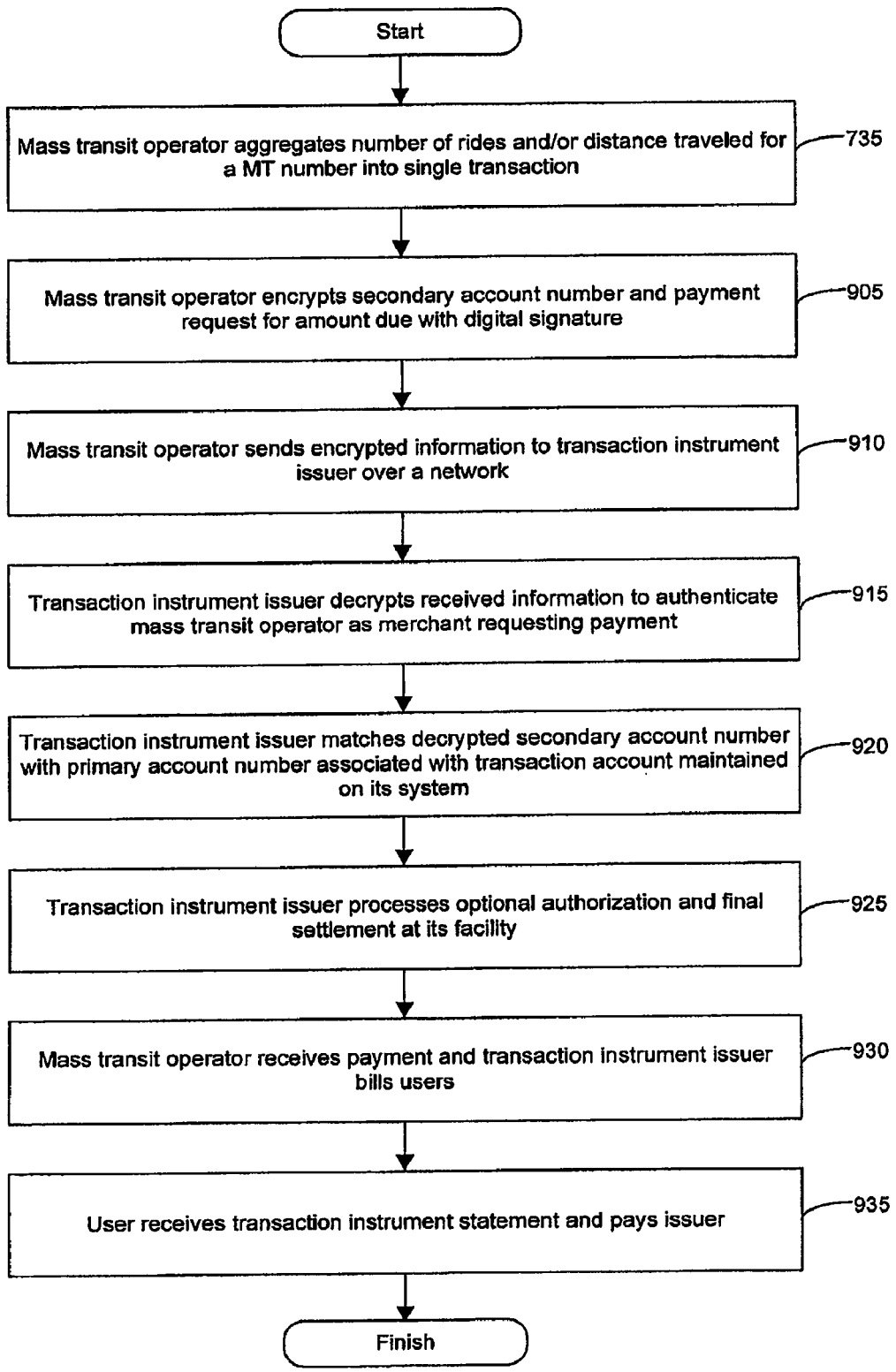

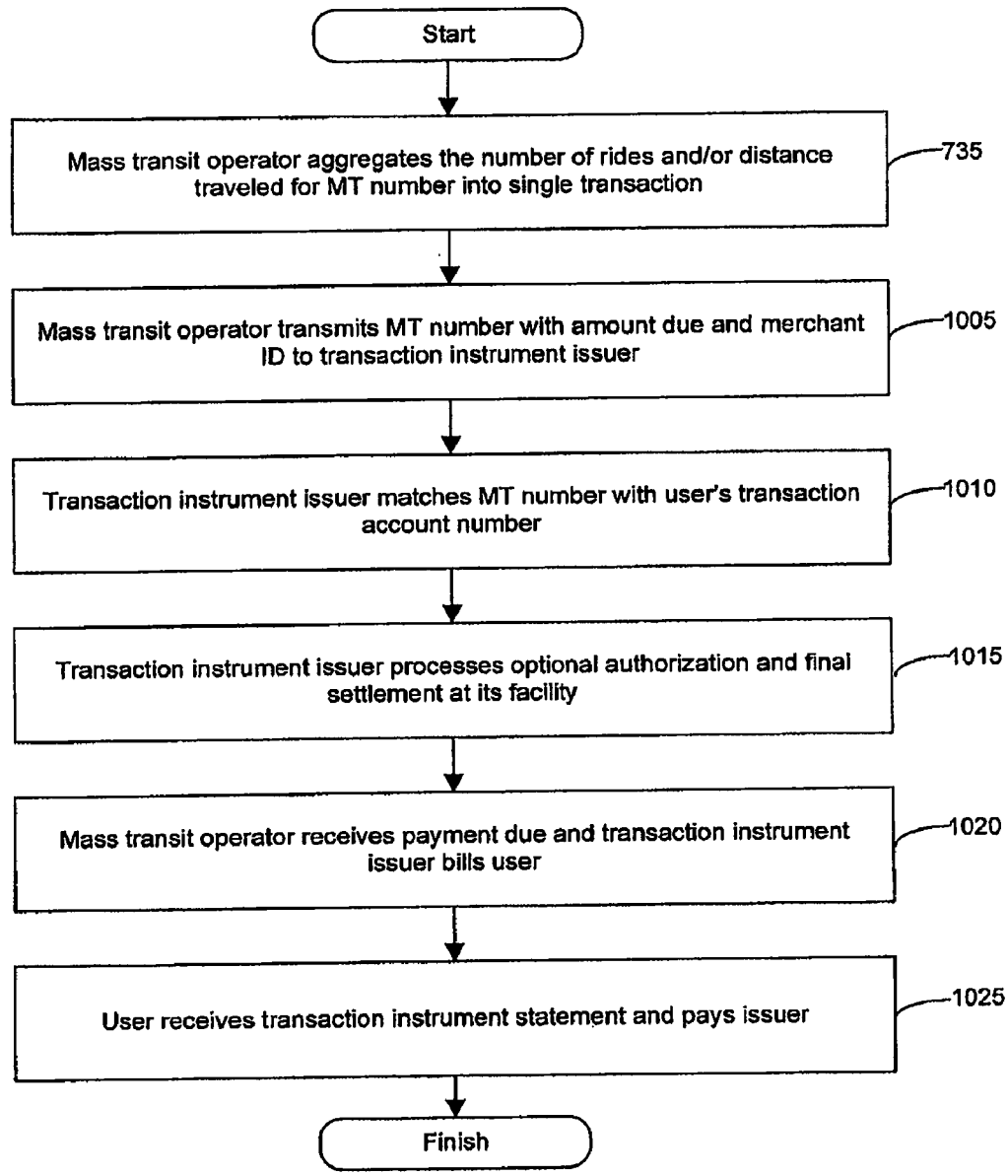

SYSTEM AND METHOD FOR MASS TRANSIT MERCHANT PAYMENT

CROSS REFERENCE TO RELATED APPLICATIONS

This application is a continuation of, and claims priority to, U.S. Ser. No. 12/768,900 filed on Apr. 28, 2010 and entitled "SYSTEM AND METHOD FOR MASS TRANSIT MERCHANT PAYMENT." The '900 application is a continuation of U.S. Pat. No. 7,731,086 issued on Jun. 8, 2010 (fka U.S. Ser. No. 11/423,388, filed on Jun. 9, 2006 and entitled "SYSTEM AND METHOD FOR MASS TRANSIT MERCHANT PAYMENT"). The '086 patent claims priority to, and the benefit of, U.S. Provisional Patent Application Nos. 60/689,300, filed Jun. 10, 2005, and 60/762,011, filed Jan. 24, 2006. All of which are hereby incorporated by reference in their entirety.

BACKGROUND OF THE INVENTION

1. Field of the Invention

The present invention generally relates to methods for making credit card purchases of everyday transit fares and collecting individual fare payments by a mass transit operator over a predetermined period and submitting an aggregated authorization and settlement request at the end of the predefined period (e.g., a day or a number of days). The invention also relates to methods for dynamically obtaining credit card numbers at the time of payment submission, so that credit cards numbers are not stored locally at the mass transit operator's site.

2. Related Art

Regular commuters as well as infrequent mass transit riders would like the convenience of not requiring a separate payment device for paying transit fares. Particularly in today's "plastic economy", riders are as anxious to use their credit cards to make instant fare payments as with any other category of purchase. Attempts to use a credit card directly for payment of one-time, sporadic, or regular mass transit fares, however, have not been successful due to various obstacles and incompatibilities.

Specifically, single ride transit fare payments cannot be authorized individually by a credit card issuer in a mass transit environment, i.e., at the time that the passenger enters the transit location or boards a particular mode of transportation. The rapid response time required for processing payment information when entering and/or exiting mass transit gates, typically 90-300 milliseconds, is too short to complete a traditional transaction instrument payment, such as a debit or credit card transaction, that requires authentication and approval of the payment device. Consequently, the excessive transaction wait time has, until now, made the payment of mass transit fares with a conventional credit card impractical.

At the same time, mass transit fares are low value purchases (typically $2-$3), making the processing of individual transactions a highly unprofitable venture for any credit card issuer.

One solution would be to store credit card numbers on a central computer of the mass transit operator. However, when credit card numbers are stored on a merchant system (for example on a local disk), this information is then susceptible to hacking and distribution of active credit card numbers for fraudulent use. Many incidents of this nature have been reported, which make it necessary for the credit card organization to cancel the compromised credit cards numbers and issue new cards to the affected cardmembers.

Another conventional solution to this problem is to have the customer load value on a card to be used for mass transit payment. Here, mass transit users may pre-load money value on a "pre-paid" fare card, and the value is reduced for each trip the user takes. Users need to track the residual value on the card and "top it up" when the value drops below the price of a trip. The value loaded is recorded by the mass transit operator's system, and a fare is deducted each time the customer enters or leaves the transit system. With stored value mass transit cards, users may use credit cards to, at most, either load a lump-sum value on the mass transit payment card or purchase "time ticket" cards for a prepaid daily, weekly, monthly, or yearly duration.

Other conventional approaches to linking different types of financial transaction instruments with stored-value mass transit fare cards are known in the art. One such implementation is the Octopus Card, which is a rechargeable, contactless stored-value card for paying fares on Hong Kong's public transportation system and is accepted for retail purchases at various stores and restaurants throughout the city. For retail purchases, electronic cash is deducted from the remaining balance on the Card. Then, for mass transit operation, the Octopus Card utilizes Sony® Corporation's FeliCa proprietary contactless radio frequency identification (RFID) technology, comprising a 13.56 MHz chip that enables fare deduction from value stored on the card, allowing contactless entry into the public transportation system. However, the Octopus Card suffers from the shortcomings associated with stored-value payment instruments. Since value is deducted from the Octopus Card with each ride on the transit system, a user must constantly be aware of the balance remaining on their card at any given time. Consequently, the need periodically to refill money onto the card inevitably slows users' commute.

Related to the Octopus Card is the Suica® Card, currently in circulation on the East Japan Railing Company (JR East) throughout parts of Japan. The Suica® Card ("Super Urban Intelligent CArd") likewise employs Sony's® proprietary FeliCa radio frequency identification technology to provide contactless entry into JR East railway lines, in place of conventional magnetic strip fare cards. Yet, as with the Octopus Card, Suica® too is merely a stored-value card again requiring users to periodically add value to their cards.

Another conventional example of a mass transit fare "smart card" linked to a financial transaction instrument is the Citi® Platinum Select® SmarTrip® MasterCard®, combining the Washington Metropolitan Area Transit Authority's (WMATA) SmarTrip® fare card with Citi®'s credit card. This transaction instrument allows users to make retail purchases at stores, restaurants and services with the credit card function, in addition to riding the mass transit system operated by WMATA, including rail and bus service throughout the Washington, D.C. area. However, with this combined credit card/smart card, the mass transit and financial transaction functions are operationally distinct, though incorporated within a common payment device. Specifically, while operating as a credit card for ordinary retail purchases, the Citi® Card only stores up to $300 in WMATA transit value, and this stored value must be periodically reloaded at a mass transit station. Accordingly, although this device presents a step above conventional stored-value cards in that it provides the functionality of a credit card, the Citi® Card nonetheless fails to alleviate the burden of having to periodically refill the limited mass transit value.

Given the foregoing, what is needed is a system, method and computer program product for enabling payment of transit system fees using a financial transaction instrument. Specifically, there exists a need for enabling use of a credit card to make mass transit fee payments to eliminate periodic refilling of value onto mass transit fare cards. There is also a need for a transaction instrument that combines the ease of RFID technology with the convenience of credit card transactions as with ExpressPay™ for mass transit payment. There is also a need to overcome the impracticality of conducting a conventional credit card transaction for every ride on a mass transit system. Further still, there is a need to settle financial transactions without storing users' primary account numbers locally on merchant systems.

BRIEF DESCRIPTION OF THE INVENTION

The present invention meets the above-identified needs by providing a system, method and computer program product for mass transit merchant payment.

In accordance with one embodiment of the present invention, there is provided a method for enabling payment of transit system fees using a financial transaction instrument that proceeds by permitting entry onto a transit system by recognition of information included in an identification number stored on a financial transaction instrument, followed by associating the identification number stored on the financial transaction instrument with a transit system fee registered for each use of the transit system. The method further includes aggregating a plurality of transit system fees associated with the same identification number from use of the financial transaction instrument, and then requesting payment for the aggregated transit system fees from a transaction account associated with the financial transaction instrument.

In accordance with another embodiment of the present invention, there is provided a method for enabling payment of transit system fees using a financial transaction instrument that further includes requesting payment for the aggregated transit system fees by transmitting the identification number to a transaction instrument issuer for matching with a transaction account number associated with the financial transaction instrument, for processing and settlement.

In accordance with yet another embodiment of the present invention, there is provided a method for enabling payment of transit system fees using a financial transaction instrument that further includes requesting payment for the aggregated transit system fees by transmitting an encrypted secondary transaction account number and a total aggregated transit system fee amount to a transaction instrument issuer for matching with a primary transaction account number associated with the transaction account, for final processing and settlement.

In accordance with still another embodiment of the present invention, there is provided a method for enabling payment of transit system fees using a financial transaction instrument that further includes requesting payment for the aggregated transit system fees by transmitting the identification number along with a total aggregated transit system fee amount to a transaction instrument issuer, for final processing and settlement.

An advantage of the present invention is that it eliminates the need to refill the payment device when using mass transit. Unlike conventional stored-value cards, the present invention fully integrates fare payment on mass transit systems into the credit card function, thereby relieving the user from having to constantly remember the current balance remaining on their card when routinely riding subways and buses. As with any retail credit card purchase, the user simply pays the bill at the end of some preset period, with the cost of each ride through-out the entire billing cycle aggregated into a single transaction appearing on the user's billing statement.

Another advantage of the present invention is its compatibility with various mass transit systems and operators. Particularly, any mass transit operator is able to provide a transaction instrument issuer active mass transit identification numbers for use on its system, to be linked with a financial transaction instrument that will then allow for the periodic aggregation of fares into a single transaction for settlement. Thus, the benefits of the present invention can be extended to mass transit systems in cities and municipalities across the country, and even internationally. Further, because the RFID technology used for financial transactions operates on the ISO-14443 standard in the present invention, mass transit operators may over time convert to this uniform protocol, thus freeing them from current proprietary technologies.

Still another advantage of the present invention is that users' primary transaction account numbers (i.e., credit card numbers) are at no time stored on the system of the mass transit operator, but instead remain in the strict possession of the transaction instrument issuer. Since processing and settlement of the transaction proceeds according to conventional methods for credit card payment, sensitive information is not stored locally at any site of the mass transit operator. The present invention thus safeguards against identity theft and credit card fraud, in addition to the hassle of reports and cancellations of lost or stolen cards.

Yet another advantage of the present invention is the versatility it provides by employing RFID technology for mass transit payment as well as regular retail purchasing, both in terms of mobility and ease of use (simply swiping the device over the reader) and implementation within a variety of forms (card, cell phone, fob, key chain tag, etc.). Moreover, because the transaction instrument operates on the ISO-14443 protocol for IC transactions, the present invention is already compatible with existing retail systems for RFID payment while further promoting standardization.

Further features and advantages, as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 6 is a flowchart outlining a process for combining the function of a mass transit identification number with a transaction instrument associated with a financial transaction account in accordance with one embodiment of the present invention.

FIG. 7 is a flowchart outlining the operation of a RFID transaction instrument for payment of mass transit fees as part of a transaction in accordance with one embodiment of the present invention.

FIG. 8 is a flowchart outlining one method for settlement of an aggregated mass transit transaction in accordance with one embodiment of the present invention.

FIG. 9 is a flowchart outlining another method for settlement of an aggregated mass transit transaction in accordance with one embodiment of the present invention.

FIG. 10 is a flowchart outlining yet another method for settlement of an aggregated mass transit transaction in accordance with one embodiment of the present invention.

DETAILED DESCRIPTION

I. Overview

Figure 1:
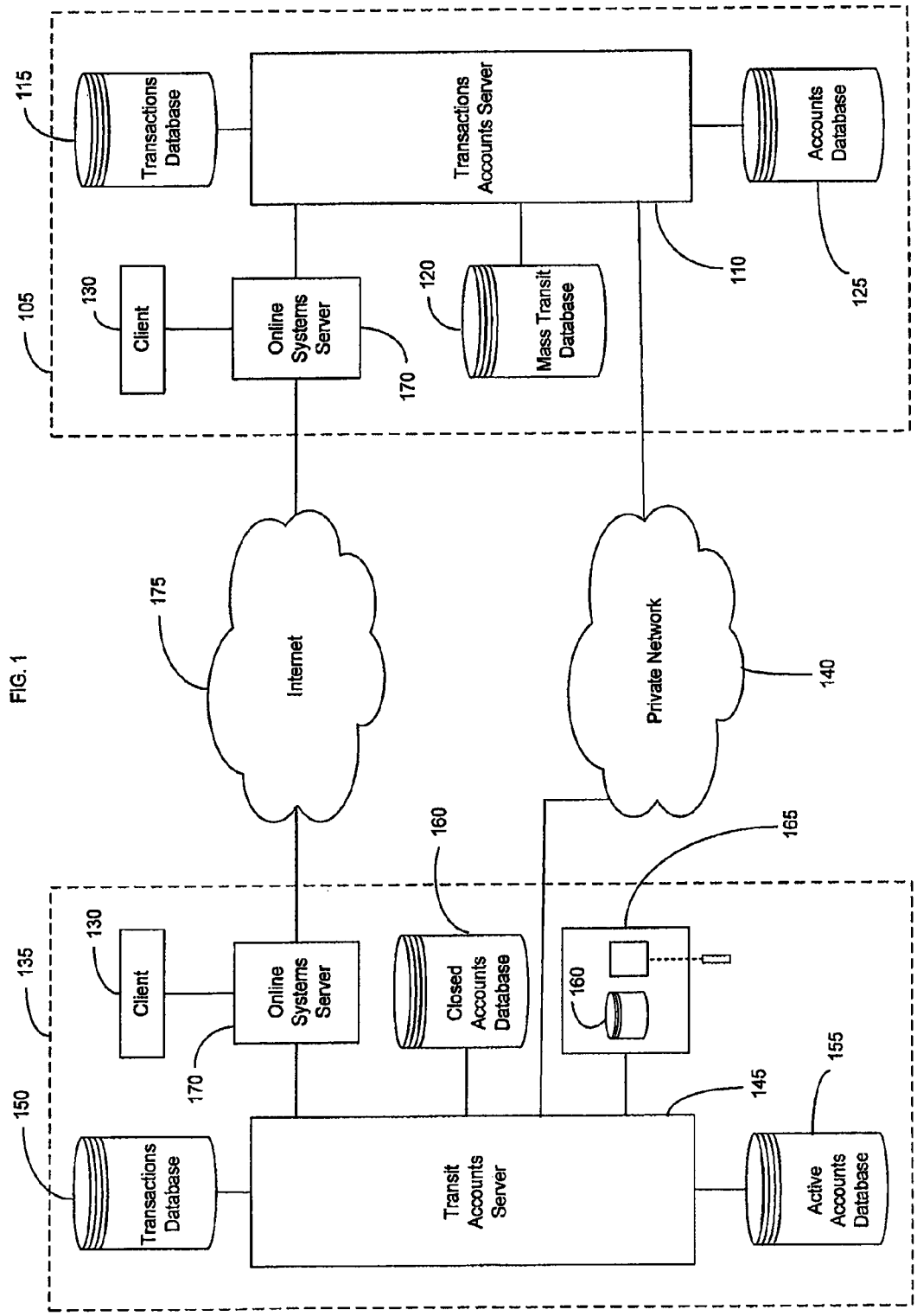
FIG. 1 is a system block diagram illustrating a transaction accounts system linked via a series of networks to a transit accounts system in accordance with one embodiment of the present invention.

The present invention is described in more detail herein in terms of an exemplary embodiment. This is for convenience only and is not intended to limit the application of the present invention.

Generally speaking, the invention combines the functionality of ExpressPay™, which is an American Express® financial transaction instrument that uses radio frequency identification (RFID) technology, with a system for making payment in mass transit (MT) systems. Therefore, the present invention operates analogously to a purchase done at a grocery store, in which a number of purchases, e.g., mass transit fares, are collected and paid for in a single transaction. In such a system, a mass transit system identification number is used to track and record the collection of these items over a period of time. At the end of the period of time, the mass transit operator, acting as any conventional merchant, requests payment for the items acquired by the traveler from the issuer of the payment device (for example American Express). From that point, the transaction is handled similar to a typical merchant transaction.

Remarkably, the entire mass transit operator is viewed and processed as a single merchant. The traveler enters the merchant "store," i.e., the mass transit system, and collects items that will be purchased. These items are the services provided by the mass transit operator such as train and subway rides, bus rides, use of parking facilities, and any other service offered by the mass transit operator.

During a typical RFID transaction, a RFID transaction device user may transmit information concerning the user's transaction account to a merchant point of sale (POS). The information received by the POS may include, for example, the transaction device identifier or account number. The information may further include personal, demographic, biometric or statistical information related to the transaction device user. Upon receiving the information, the merchant POS ordinarily provides the information to a merchant system.

In the present invention, a transaction device identifier in the form of a mass transit identification number is linked to a financial transaction device, particularly a credit card, equipped with RFID transmission capability. Once activated, the user waves their transaction instrument over the gate reader serving as the merchant point of sale, to gain access onto a train, subway or bus. The RF signal emitted by the transaction instrument is recognized by the RFID reader contained within the gate terminal and the "transaction" is recorded onto the system of the mass transit operator. Thus, the present invention applies the convenience of RFID technology for payment of everyday commutes on mass transit systems.

The system of the present invention also changes the manner in which the MT operator accepts and processes payment. Instead of having the traveler pay at the time of the ride, the customer actually has a token that identifies the customer to the mass transit operator and allows the mass transit operator to record the services used by the customer. The number of rides and/or distance and/or time traveled by the user tracked by the MT number is then stored as data on the system of the mass transit operator. At some agreed time period (or spending limit), the mass transit operator submits an authorization request to the acquirer to obtain payment for the services used by the customer in the agreed time period (or up to a specified spending limit). Standard financial networks (such as those provided by American Express, Visa, MasterCard or Discover card) may be used to conduct this transaction. Accordingly, the present invention further provides the advantage of deferred credit card payment for everyday purchases of mass transit fares.

In certain embodiments, the transaction instrument, i.e., the payment device, may comprise two separate electronic chips—one for handling retail payments and one for handling mass transit fares. The device may be, for example, in the form of a key chain fob or in the form of a card. In other embodiments, in order to reduce costs and make the processes simpler, the mass transit payment functionality may be added to an existing application for retail payment, e.g., ExpressPay™, and may be run on a single chip.

In the present invention mass transit transactions are compiled on a periodic basis and transmitted from time to time as a single authorization request to the credit card issuer, e.g., American Express. This may require a software and/or hardware change for the mass transit operator, so that instead of the operator receiving payment at the point of making the transaction, the transaction data is stored and then provided to the credit card organization at a later point. Thus, the system is referred to as a "post-pay" system, as opposed to a "prepaid" system.

However, embodiments of the present invention also may be implemented as a prepaid system. For example, customers may be issued a prepaid card by a credit card organization, such as American Express, or other financial organization that is managed independently of the mass transit operator's payment system. Such a prepaid card may be a general prepaid product, in the sense that it may be used for retail purchases in addition to mass transit fee transactions.

The terms "user", "end user", "consumer", "customer", "participant", "owner", "requestor" and/or the plural form of these terms are used interchangeably herein to refer to those persons or entities capable of accessing, using, being affected by and/or benefiting from the tool that the present invention provides for mass transit merchant payment.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A "transaction instrument issuer" is any entity that maintains a transaction account for customers to conduct financial transactions using a financial transaction instrument. One example of such entity is American Express, or any other company that provides members with transaction instruments and thereby maintains corresponding transaction accounts.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of $N_1N_2N_3N_4N_5N_6N_7N_8N_9N_{10}N_{11}N_{12}N_{13}N_{14}N_{15}N_{16}$ The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember. A merchant account number may be, for example, any number or alpha-numeric characters that identifies a particular merchant for purposes of card acceptance, account reconciliation, reporting and the like.

Meanwhile, a "financial transaction instrument" may be a traditional plastic transaction card, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Importantly, it should be noted that the form of the financial transaction instrument is not limited to a particular transaction card. Instead, the present invention may be implemented within any device configured for both RFID retail payments and mass transit ticketing. Such devices may include a fob, key chain ring, tag and, particularly, a mobile telephone. In the case of the latter, the phone may operate on the ISO/IEE-18092 standard, compatible with the ISO/IEE-14443 standard, for conducting payment and other contactless transactions.

Financial transaction instruments may also be of various functional varieties. For instance, "open cards" are financial transaction cards that are generally accepted at different merchants. Examples of open cards include the American Express®, Visa®, MasterCard® and Discover cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

In contrast, "stored value cards" are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars. Presently, all conventional fare payment devices as those described above exemplify stored-value instruments that inevitably require refilling the value.

The term "mass transit operator" refers to any entity whether regional or local that maintains a transportation system within a given geographic area such as, for example, within a city or suburb. The "transit system" may comprise a combination of various transportation modes, such as, for example, a subway, train, shuttle, bus system or any other form of regularly-operating public or private transportation system. Examples of mass transit operators include, but are not limited to, the Washington Metropolitan Area Transit Authority (WMATA), the Metropolitan Transit Authority for the State of New York (MTA), and the Regional Transportation Authority (RTA) including the Chicago Transit Authority (CTA).

The "mass transit identification number" ("MT number") is an identification number created by the mass transit operator and associated with a mass transit account. This number identifies an active mass transit account once it has been established, and is used to track and store the number of transactions, that is, the number of rides and/or distance traveled by the user, for eventual aggregation.

The mass transit operator creates a new MT number associated with each new active MT account it maintains, and forwards the MT number to either the transaction instrument issuer directly or, alternatively, to a card issuing bureau to be linked with a financial transaction account. The MT number may be provided individually or in a series as activated microchip inlays. An example of such MT number is the SmarTrip® number issued by the Washington Metropolitan Area Transit Authority.

Furthermore, the "card issuance bureau" may be an outside vendor or entity that performs the physical process of linking the microchip containing the MT number and the microchip containing the RFID financial transaction account information (e.g. Express Pay™), incorporating the two within a single payment device such as a credit card, key chain fob, or mobile telephone. Alternatively, the card issuing bureau may incorporate the account information for both the mass transit account and the financial transaction account into a single microprocessor, housed within a card, key chain fob, or any other payment device.

As used herein, an "acquirer" may be anyone who operates and maintains computer systems and databases (which may be the credit card issuer, but is typically a third party) for facilitating the routing of a payment request to an appropriate account issuer. The acquirer may route the payment request to the account issuer in accordance with a routing number, wherein the routing number corresponds to the account issuer. The routing number may be provided by the RFID transaction instrument. The "routing number" in this context may be a unique network address or any similar device for locating an account issuer on a network. Traditional means of routing the payment request in accordance with the routing number are well understood. As such, the process for using a routing number to provide a payment request will not be discussed herein.

II. System

FIG. 1 is a system diagram of an exemplary embodiment of the present invention. The issuer of the transaction instrument maintains a transaction accounts system 105, which processes and stores information relating to the transaction accounts. Transaction accounts system 105 may include, for example, a server 110 configured to communicate with a number of client computers via a network (depicted in FIG. 1 as lines connecting the server to the client computers), e.g., a local area network (LAN), or a mainframe computer configured to communicate with a number of terminals.

Transaction accounts system 105 includes a transaction database 115, a mass transit database 120, and an accounts database 125. During operation, any data regarding a particular account holder with a linked mass transit account is stored in the appropriate corresponding database in transaction accounts system 105, with transaction accounts server 110 processing the data among the several linked databases and client computers 130, as described below.

Transaction database 115 stores all information relating to transactions conducted with the financial transaction instrument linked to the transaction account. For instance, when in a given billing cycle a user purchases clothing at an outlet store, dinner at a restaurant, and takes a total of 46 rides on the subway, data relating to the respective transactions is transmitted by the outlet store, the restaurant and the mass transit operator to the transaction instrument issuer. Assuming each transaction is individually approved, the instrument issuer pays each separate merchant and issues a bill to the account holder. The transaction data is stored in the transaction database for billing and record-keeping purposes, among other uses.

Mass transit database 120 stores activated mass transit identification numbers (MT numbers) received from the mass transit operator. Once the mass transit operator activates and forwards at least one new MT number to the transaction instrument issuer, the number is linked to a financial transaction account of an eligible customer.

There is also associated with server 110 an account database 125 storing identification, personal, and contact information provided by account holders to the transaction instrument issuer, together with the account number for the holder's transaction account with which all of the foregoing information is associated. The information may include the account holder's name, address, Social Security number, telephone number, and e-mail address, as well as data indicating whether they have a mass transit account linked with their financial transaction instrument account.

Of course, the present invention is not limited to only the databases mentioned above, and additional databases as part of transaction accounts system 105 storing other information may also be provided. These databases may be stored as a single database or as physically or logically separate databases, as depicted in FIG. 1. The physical storage device or devices may be either internal or external to transaction accounts system server 110.

There are also several client computers 130 associated with transaction accounts system 105, each capable of accessing this system to retrieve information stored in any of the databases depicted in FIG. 1. It is to be understood that although only one client computer appears in system 105 in FIG. 1, there may be numerous client computers connected to the transaction accounts server via various types of network and direct connections.

Also illustrated in FIG. 1 is a transit accounts system 135 in communication with transaction accounts system 105 via a closed network 140, such as the American Express® Network for conducting secure financial transactions. Transit accounts system 135 may, for example, include a server 145 configured to communicate via a LAN, or any other conventionally known set of links, with a number of client computers or terminals 130. The transit accounts server processes stored information relating to both active and closed mass transit accounts for riders of the mass transit system.

Transit accounts system 135 comprises a transaction database 150, an active accounts database 155, a closed accounts database 160, as well as a plurality of gate terminals 165 located throughout a multitude of stations comprising the mass transit operator's service network or, alternatively, fixed into various modes of transportation, including buses. In addition, there may be several client computers 130 connected to transit accounts server 145.

Transit accounts system 135 includes a transaction database 150 that stores information on individual customers' use of the mass transit system, based on the number of times the customer passes through gate terminals 165 located at the numerous mass transit stations. Specifically, database 150 maintains a running tally for each MT number entering or exiting the mass transit system so that every ride and/or distance traveled is recorded and stored in the transaction database for periodic tabulation into a single transaction.

There is also associated with transit accounts system 135 an active accounts database 155 storing information received from the transaction instrument issuer over a data link. The information stored within this database constitutes the active MT numbers originally provided by the mass transit operator that have subsequently been linked to a financial transaction instrument by the instrument issuer. The MT numbers stored in this database comprise mass transit accounts for which the transaction instrument issuer has verified that the user has a valid transaction account with a clear line or credit for settling transactions conducted via the financial transaction instrument.

FIG. 1 further illustrates a closed account database 160 connected to transit account server 145. In contrast to active accounts database 155, the closed accounts database 160 stores those MT numbers identified by the transaction instrument issuer as having a cancelled or temporarily suspended transaction account, and therefore constituting a closed mass transit account. The information stored within the closed accounts database is used by the mass transit operator as a reference list to prevent a user presenting a closed MT number from fraudulently riding the mass transit system and deferring payment until the close of the billing period.

In FIG. 1, transaction accounts system 105 is connected to transit accounts system 155 by a data link 140, which may be a secure "payment network" or other type of dedicated electronic link. This link 140 allows sensitive information, including transaction account numbers, to pass over a secure channel between the two servers, in order to process, authorize, and complete a financial transaction as, for instance, with any conventional credit card transaction involving a merchant and instrument issuer. The data may be transmitted between the systems using, for example, a secure encrypted messaging protocol (SCMP). In the present embodiment, network 140 may constitute any existing proprietary network that presently accommodates transactions for credit cards, debit cards, loyalty cards, and other types of financial/banking cards. Specifically, payment network 140 is a closed network that is assumed to be secure from eavesdroppers. Examples of the payment network include the American Express®, VisaNet® and the Veriphone® network. Such connections are widely known in the art and will therefore not be explained in greater detail herein.

Transaction accounts server 110 and transit accounts server 145 may each be connected to an online systems server 170 within their respective systems, in order that both systems may additionally communicate over a public network 175, e.g., the Internet. Under this configuration, transit account system 135 may be accessible from multiple locations, as when more than a single mass transit system is connected thereto.

Online systems servers 170 depicted in FIG. 1 may be any server known in the art, capable of supplying information from the databases of one system to the other system, as well as to a plurality of client computers 130 over the network. The content of the information provided may be written and subsequently viewed in any conventional network language and/or graphics format including HTML, Java Script, XML, and the like. Furthermore, the content of the information passing between the transaction accounts system and the transit accounts system may be secured by any conventional encryption means including SSL, PGP®, or any other algorithmic methods for electronically securing information. In a particularly preferred embodiment, the data passing between the systems over network 175 includes a digital signature for authentication purposes.

Information may be retrieved from online systems server 170 in each respective system of FIG. 1 by a client computer 130, which may be located at the facilities of the mass transit operator and instrument issuer. Such client computers may be personal computers, as well as terminals, workstation, or any other device for enabling operators of either system to access the information stored therein.

Figure 2:
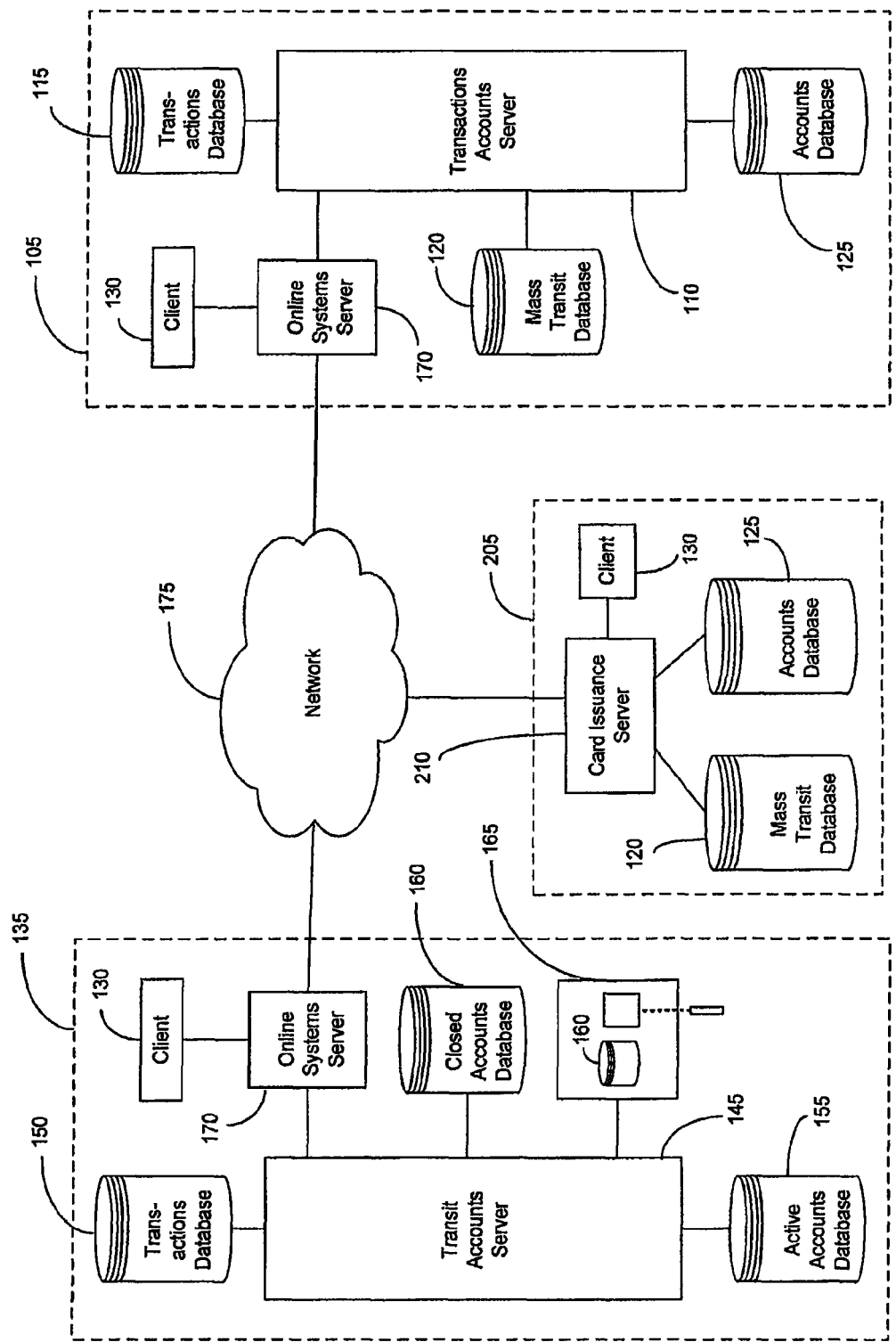
FIG. 2 is a system block diagram illustrating a transaction accounts system linked over a network to a transit accounts system, both systems additionally linked to a card issuance bureau over the network in accordance with one embodiment of the present invention.

In an alternative embodiment, as illustrated in FIG. 2, transaction accounts system 105 and transit accounts system 135 may be in connection with a card issuance system 205, maintained by a card issuance bureau, over a network 175. Card issuance system 205 links the issuance bureau, an independent vendor with which the instrument issuer has contracted to assemble the physical transaction device, to some of the information stored on the transaction accounts and transit accounts systems so that it may access data necessary for assembly of the transaction instrument. Card issuance system 205 includes a card issuance server 210 connected by data links, e.g., a network, to both a mass transit database 120 and an accounts database 125.

Card issuance server 210 may be any type of server conventionally known in the art, capable of processing information stored within any of the number of databases comprising card issuance system 205. Issuance server 210 is further connected via an electronic link 175, such as a private network, the Internet, or other type of data connection, to both transaction accounts server 110 at the transaction account issuer and transit accounts server 145 at the mass transit operator, and the issuance server is configured for the communication of data (such a MT numbers and transaction account numbers), between these respective systems.

Associated with card issuance server 210 is an accounts database 125 that stores information relating to the financial transaction accounts of the transaction instrument issuer's customers. Such information may include the transaction account number as well as the customer's personal information, as provided by the instrument issuer. Certain pieces of information stored on the transaction accounts database may be incorporated into the transaction instrument device, e.g., credit card, key chain fob, or the like, issued by the card issuance bureau.

Referring again to FIG. 2, a mass transit database 120 is included in card issuance system 205. Mass transit database 120 stores MT numbers that are provided by the mass transit operator, over a network 175, to the card issuance bureau for incorporation into the transaction instrument device. The MT numbers are newly-created by the mass transit operator for use on its system. It should be noted that while only the above databases are depicted in FIG. 2, card issuance system 205 is by no means limited to only these and may certainly accommodate additional databases for other types of information.

Card issuance server 210 is connected to both transaction accounts server 110 and transit accounts server 145 by an electronic link 175. This link may be any conventional data link or network that allows for the transmission of encrypted information between the three systems connected thereby. Because transaction account numbers constitute sensitive information requiring protective measures, in the present invention transmission of this information between the various systems may be conducted over a secure network as encrypted data.

Card issuance system 205 further includes client computers 130 for accessing the information stored in the associated databases. As above, client computer 130 may be implemented as, for example, a personal computer, workstation, or other terminal for retrieving information stored on the system. Of course, although only a single client computer is shown, the present invention accommodates a plurality of client computers, all linked to card issuance server 210 in order that operators of the card issuance bureau may access the information for physically integrating the circuitry and associated data of the two separate functions into a single transaction device.

A number of entry gate terminals 165 are connected to transit accounts server 145 at the mass transit operator, which serve as the locations at which riders gain access to and exit from the mass transit system. Although only a single gate terminal is depicted in FIGS. 1 and 2, the present invention accommodates a plurality of such terminals, located at each station in the mass transit system. Moreover, each station may contain numerous gate terminals, all electronically connected over a network to the mass transit server. These gate terminals 165 function as the points-of-sale for customers' use of the mass transit system.

Figure 3:
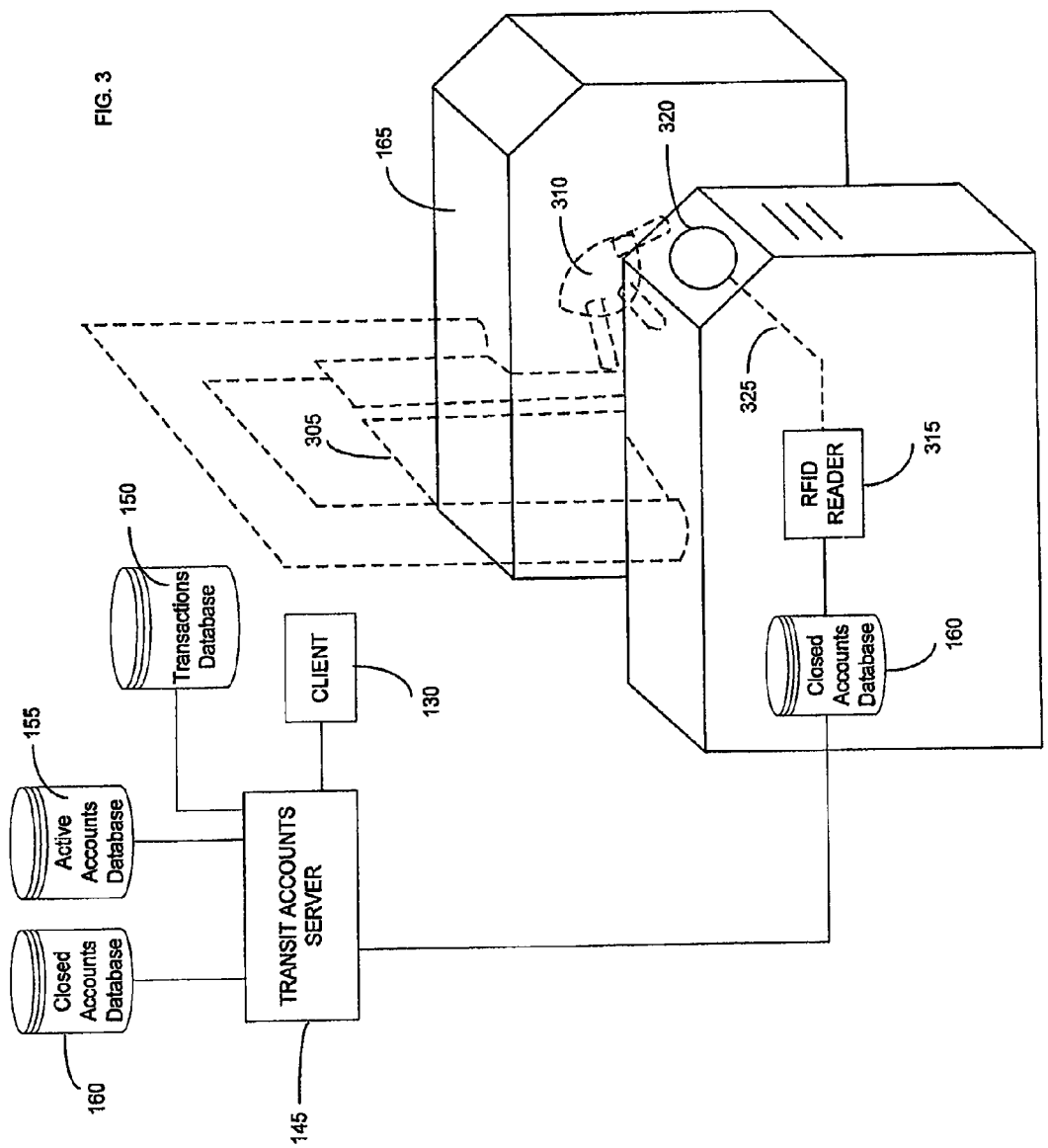
FIG. 3 is a schematic illustration of an exemplary gate terminal associated with the transit accounts system in accordance with one embodiment of the present invention.

As illustrated in FIG. 3, each gate terminal 165 is configured to read transaction instruments linked to active MT numbers. That is, these terminals contain gates 305 or turnstiles 310 along with RFID readers 315 to detect the MT number stored in the payment device presented by the user for interrogation upon entry into and/or exit from the mass transit system (depending on which point the mass transit operator collects fares). The reader 315 at each gate terminal 165 detects the radio frequency signal emitted by the transaction instrument at a close distance. The readers of the present invention are compatible with the ISO-14443 protocol standard of certain RFID transaction instruments including, for example, those issued by the American Express Company for its ExpressPay™ platform, as will be described below in greater detail.

As noted above, the gate terminals 165 function as point-of-sale locations for customers "purchasing" the service offered by the mass transit operator, namely, transportation between given locations, with their linked transaction instruments. Each gate terminal 165 is capable of accessing a closed accounts database 160, which preferably is stored in the gate itself, so as to minimize access time. The database of closed MT numbers may be periodically uploaded by the mass transit operator from the closed accounts database, in order to reference a presented MT number against the list so as to initially determine whether to permit entry.

The transaction instrument contains a transponder configured for RF communication with RFID reader 315 at gate terminal 165 in a mass transit station. In general, the transaction begins when the transaction instrument is presented at gate terminal 165 for entry into the mass transit system and is interrogated by a RFID reader 315 housed within the terminal. The transaction instrument and RFID reader 315 may then engage in mutual authentication during which time a transponder, located within the transaction instrument, provides the MT number to RFID reader 315.

Although the present invention is described with respect to a financial transaction instrument such as a card, the invention is not to be so limited. Indeed, any device having a transponder configured to communicate with a RFID reader via RF communication and conduct financial transactions may be used including, for example, a key ring, tag, wristwatch or any such form capable of being presented for interrogation at a mass transit station. Particularly, it should be noted that the various embodiments of the financial transaction instrument described herein (i.e., single-chip and dual-chip) may just as well be incorporated within a mobile telephone as within a card, tag, or key chain fob. Each alternative embodiment of the financial transaction instrument is entirely compatible with the systems herein described for both travel on mass transit systems and subsequent account settlement.

RFID reader 315 within the gate terminal 165 may be configured to communicate using a RFID internal antenna (e.g., an antenna positioned on the same circuit board as the reader circuit). Alternatively, RFID reader 315 may include an external antenna 320 for communications with the transaction instrument, where the external antenna may be made remote to the RFID reader circuit using a suitable cable 325.

Antenna 320 may operate using a frequency of 13.56 MHz, to transmit an interrogation signal and receive an authentication request signal from the transaction instrument. In a preferred embodiment, the antenna is disposed at the most accessible point on the gate terminal for efficient interrogation of the RF signal emitted by the transaction instrument presented by users. The RFID reader may be located deeper within the gate mechanism, depending upon the individual construction of terminals used by different mass transit operators. It should therefore be understood that the gate terminals of the present invention are not limited to any particular arrangement or construction.

Gate terminals 165 are configured to detect the RF signals of both the proprietary system protocols currently in use throughout mass transit systems, as well as the ISO-14443 standard protocol adopted for contactless payment with financial transaction instruments throughout the United States by, among other issuers, American Express, Visa and MasterCard. Gate terminal 165 may be implemented using, for example, the Tri-Reader® 2 manufactured by Cubic Corporation (San Diego, Calif.), a multi-protocol interface device capable of processing both ISO-14443 Type A and B contactless smart cards, as well as the proprietary Cubic GO CARD® contactless smart cards. The terminal may include a processor (e.g., AMTEL ARU7 60 MHz CPU) running any conventional operating system in order to facilitate reading of the transaction instrument. Such gate terminals thus permit RF contactless entry and exit from mass transit systems.

Figure 4:
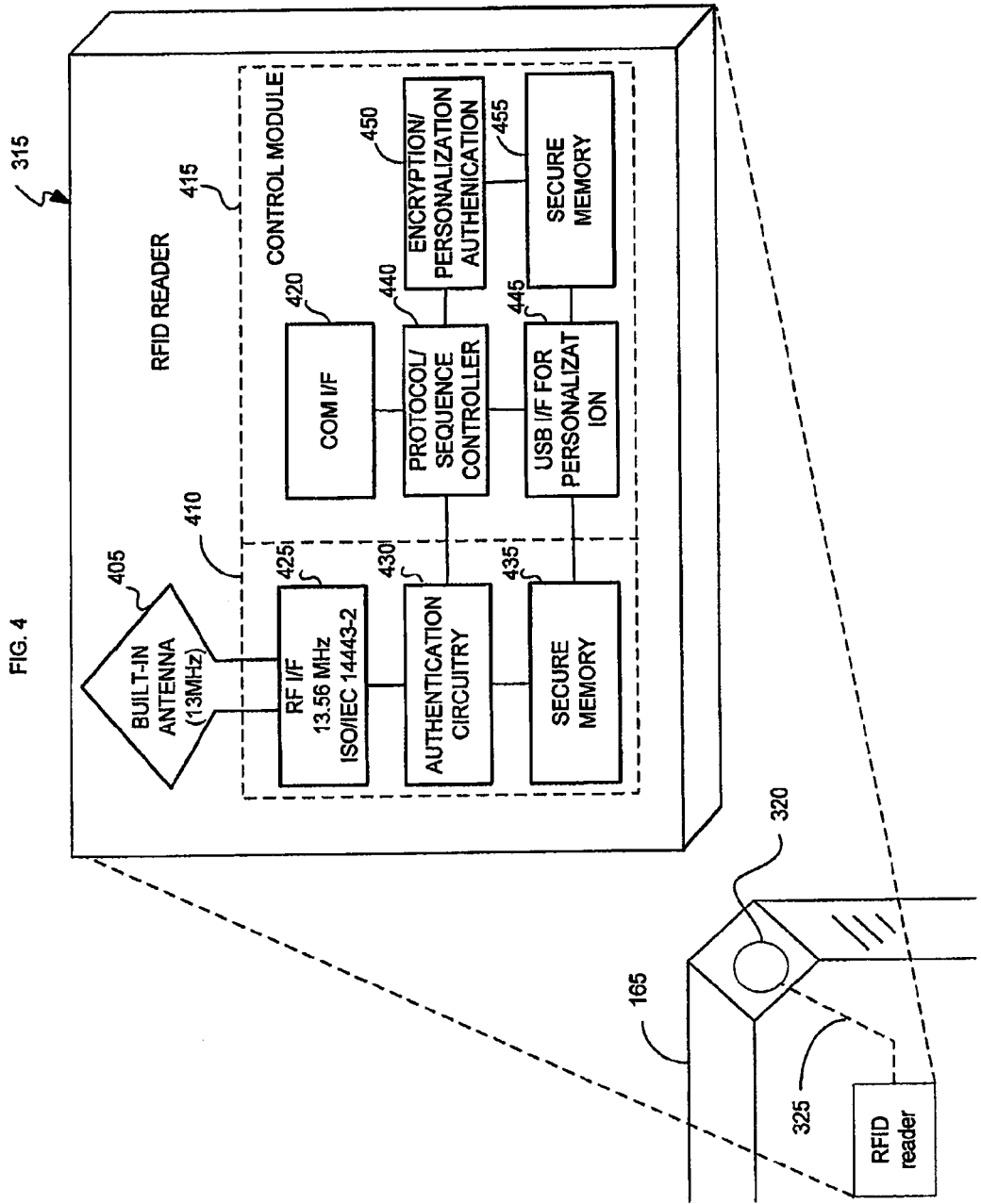
FIG. 4 is a schematic illustration of an exemplary RFID reader as incorporated within the gate terminal in accordance with one embodiment of the present invention.

FIG. 4 is an exemplary block diagram of RFID reader 315 incorporated within gate terminal 165 of the mass transit operator, in accordance with the present invention. RFID reader 315 includes, for example, an antenna 405 coupled to a RF module 410, which is further coupled to a control module 415. As noted above, the antenna 405 may be positioned remotely from RFID reader 315 and may be coupled to RFID reader 315 via a suitable cable 325, or other connection.

A protocol/sequence controller 420 may include an optional feedback function for notifying the user of the status of a particular transaction. For example, the optional feedback may be in the form of an LED, LED screen and/or other visual display, built into the gate terminal, which is programmed to light up or display a static, scrolling, flashing and/or other message and/or signal to inform the user that the transaction is initiated (e.g., the card is being interrogated), the transaction instrument is valid (e.g., card is authenticated), transaction is taking place, (e.g., MT number is being read by RFID reader) and/or the transaction is accepted or denied (e.g., MT number not listed or listed on closed account database). Additionally, such an optional feedback may be accompanied by an audible indicator (or may consist entirely of the audible indicator) for informing the user of the transaction status. The audible feedback may be a simple tone, multiple tones, musical indicator, and/or voice indicator programmed to signify when the fob is being interrogated, the transaction status, or the like.

RFID antenna 405 may be in communication with a transponder 425 for transmitting an interrogation signal and receiving at least one of an authentication request signal and/or an account data from transaction instrument. In particular, transponder 425 may be configured to send and/or receive RF signals in a format compatible with antenna 405. For example, where transponder 425 is 13.56 MHz RF rated, antenna 405 may be 13.56 MHz compatible. Similarly, where transponder is ISO/IEC 14443 rated, antenna 405 may be ISO/IEC 14443 compatible.

RF module 410 may include, for example, transponder 425 in communication with authentication circuitry 430 which may be in communication with a secure database 435. Database 435 may store RFID reader 315 identifying information for providing to the transaction instrument for use in authenticating whether RFID reader 315 is authorized to be provided the transaction account number stored on a transaction instrument database.

Authentication circuitry 430 may be configured to authenticate the signal provided by the transaction instrument, and, similarly, authentication circuitry in the transaction instrument may be configured to authenticate the signal provided by RFID reader 315. Thus, the transaction instrument and RFID reader 315 engage in mutual authentication. In this context, "mutual authentication" may mean that entry into the mass transit system may not take place until the transaction instrument authenticates the signal from RFID reader, and RFID reader 315 authenticates the signal from the transaction instrument.

Authentication circuitry 430 may additionally be in communication with a protocol/sequence controller 440, configured to determine the order of operation of the RFID reader 315 components. For example, protocol/sequence controller 440 may command the different components of RFID reader 315 based on whether a transaction instrument is present. For example, if a transaction instrument is not present, then protocol/sequence controller 440 may command the RFID reader 315 to provide an uninterrupted interrogation signal. That is, the protocol/sequence controller may command the authentication circuit 430 to provide an uninterrupted interrogation signal until the presence of a transaction instrument is realized. If a transaction instrument is present, protocol/sequence controller 440 may command the RFID reader 315 to authenticate the transaction instrument.

Authentication may mean that protocol/sequence controller 440 may command the authentication circuit 430 to provide a transaction instrument with an authorization code. If a response is received from transaction instrument, protocol/sequence controller may determine if the response is a response to the RFID reader 315 provided authentication code, or if the response is a signal requiring authentication. If the signal requires authentication, then the protocol/sequence controller 440 may activate the authentication circuit as described above. On the other hand, if the transaction instrument signal is a response to the provided authentication code, then the protocol/sequence controller 440 may command the RFID reader 315 to retrieve the appropriate security key for enabling recognition of the signal. That is, the protocol/sequence controller 440 may command the authentication circuit 430 to retrieve from database 435 a security key (e.g., transponder system decryption key), unlock the signal, and compare the signal to the signal provided by the RFID reader 315 in the authentication process. If the signal is recognized, the protocol/sequence controller 440 may determine that the transaction instrument is authorized to access the transit system. If the signal is not recognized, then the transaction instrument is considered not authorized. In which case, the protocol/sequence controller 440 may command the RFID controller to interrogate for authorized transaction instruments.

Once the protocol/sequence controller determines that the transaction instrument is authorized, the protocol/sequence controller 440 may seek to determine if additional signals are being sent by the instrument. If no additional signal is being provided, then the protocol/sequence controller 440 may provide all the components of RFID reader 315 to remain idle until such time as a signal is provided. Contrarily, where an additional transaction instrument signal is provided, the protocol/sequence controller 440 may determine if the instrument is requesting access to the gate 165 (e.g., POS device) or if it is attempting to interrogate the RFID reader 315 for return (e.g., mutual) authorization. Where the transaction instrument is requesting access to a gate terminal 165, the protocol/sequence controller 440 may command the RFID reader to open communications. In particular, the protocol/sequence controller may command the gate terminal communications interface 445 to become active, permitting transfer of data between the RFID reader 315 and the gate terminal 165.

On the other hand, if the protocol/sequence controller determines that the transaction instrument signal is a mutual interrogation signal, then the protocol/sequence controller may command the RFID reader 315 to encrypt the signal. The protocol/sequence controller 440 may command the encryption authentication circuit 450 to retrieve from database 455 the appropriate encryption key in response to the transaction instrument mutual interrogation signal. The protocol/sequence controller 440 may then command the RFID reader 315 to provide the encrypted mutual interrogation signal to the transaction instrument. The protocol/sequence controller 440 may command the authentication circuit 450 to provide an encrypted mutual interrogation signal for the instrument to mutually authenticate. The transaction instrument may then receive the encrypted mutual interrogation signal and retrieve from its authentication circuitry a RFID reader decryption key.

Encryption/decryption component 450 may be further in communication with a secure account number database 455 which stores the security keys necessary for decrypting the encrypted transaction instrument MT number. Upon appropriate request from protocol/sequence controller 440, encryption/decryption component (e.g., circuitry 450) may retrieve the appropriate security key, decrypt the MT number and forward the decrypted MT number to protocol sequence controller 440 in any format readable by gate terminal 165.

As noted previously, the transaction instrument (payment device) of the present invention may comprise either a single microchip for both the mass transit and retail payment functions or, otherwise, two separate electronic chips within the same device.

When implemented as two chips on a single device, each electronic microchip may be provided by a separate entity. An exemplary device includes a first chip for RFID-based retail transactions, such as, for example, the American Express, Express Pay™ microchip. The second chip may then comprise the SmarTrip® microchip, supplied by WMATA for RF ticketing. Under this dual-chip embodiment, each of the microchips operates independently by virtue of different transport protocols. For instance, the Express Pay™ chip functions on the ISO-14443 standard while the SmarTrip® microchip operates on WMATA's proprietary protocol. Accordingly, the transaction instrument provides for conducting RF transactions both in stores and restaurants as well as in a mass transit system.

Alternatively, a single chip on the transaction device may be programmed for both RFID-based retail purchases and access to mass transit systems. In such case, a newly-created MT number supplied by a mass transit operator is programmed onto the RFID-based retail payment microchip. For example, the existing ExpressPay™ microchip of American Express Company may be programmed to store and output an MT number created by WMATA for use of its subways, buses, parking lots, and the like, throughout the Washington, D.C. area.

Figure 5:
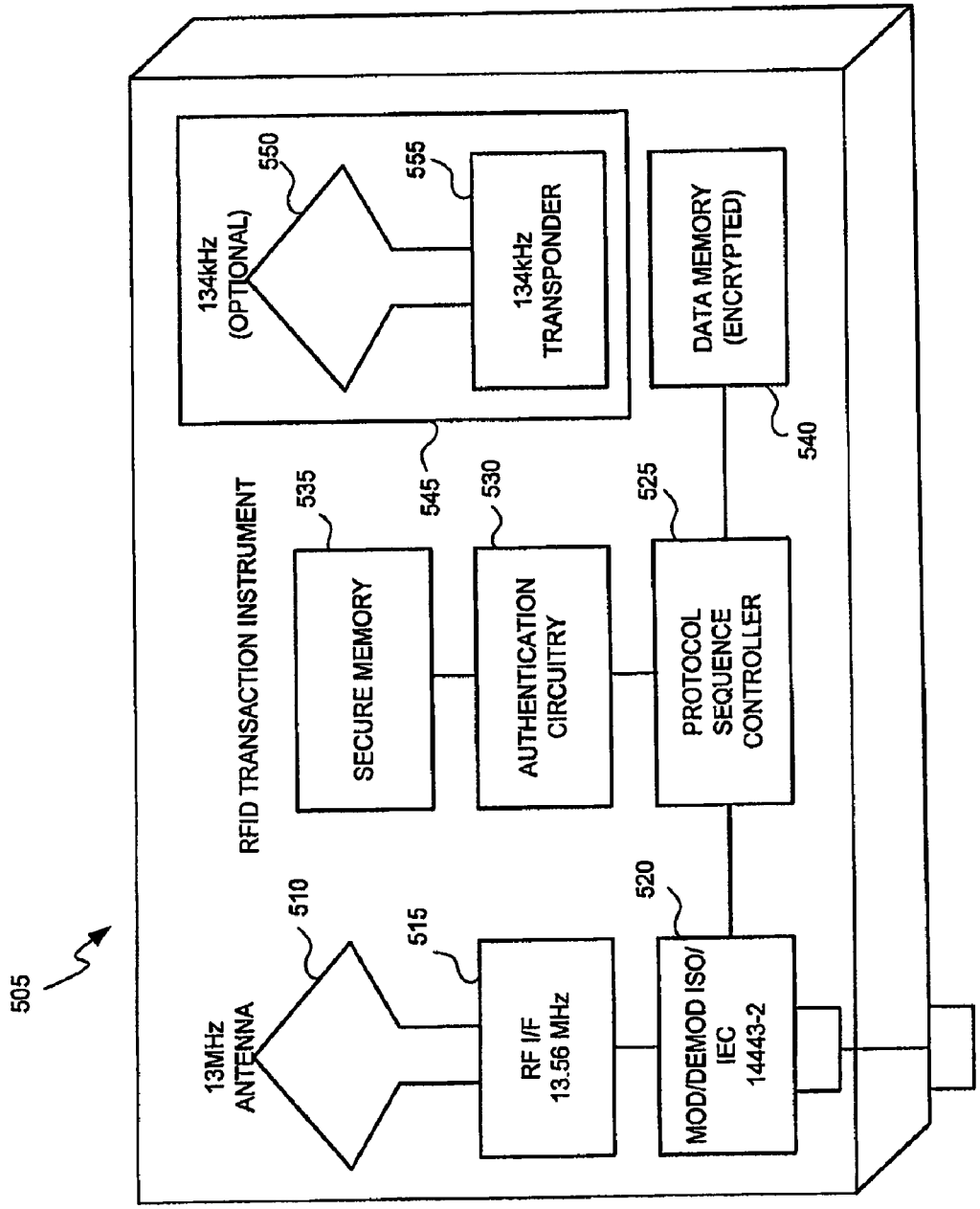
FIG. 5 is a schematic illustration of an exemplary RFID transaction instrument in accordance with one embodiment of the present invention.

Regardless of its precise configuration (i.e., single or dual-chip), however, certain technical features for RFID transactions are common to the transaction instrument of the present invention. FIG. 5 presents certain basic technical features of the RFID operation of the foregoing transaction instrument embodiments, but without in any way limiting the present invention to the precise configuration depicted therein.

As shown in FIG. 5, the transaction instrument 505 may include an antenna 510 for receiving an interrogation signal from the RFID reader 315 via such antenna. Transaction instrument antenna 510 may be in communication with a transponder 515. In one exemplary embodiment, transponder 515 is a 13.56 MHz transponder compliant with the ISO/IEC-14443 standard, with antenna 510 being a 13 MHz variety. Transponder 515 may be in communication with a transponder-compatible modulator/demodulator 520 configured to receive the signal from transponder and configured to modulate the signal into a format readable by any later connected circuitry. Further, modulator/demodulator 520 may be configured to format (e.g., demodulate) a signal received from the later connected circuitry in a format compatible with the transponder for transmitting to the RFID reader via antenna 510. For instance, where transponder 515 is of the 13.56 MHz variety, the modulator/demodulator may be ISO/IEC-14443-2 compliant.

Modulator/demodulator 520 may be coupled to a protocol/sequence controller 525 for facilitating control of the authentication of the signal provided by RFID reader 315, and for facilitating control of the sending of the MT number. In this regard, the protocol/sequence controller 525 may constitute any suitable digital or logic driven circuitry capable of facilitating determination of the sequence of operation for the transaction instrument inner-circuitry. For example, protocol/sequence controller 525 may be configured to determine whether the signal provided by RFID reader 315 is authenticated, and thereby providing to RFID reader 315 the MT number stored on the transaction instrument.

Further, the protocol/sequence controller 525 may also be in communication with authentication circuitry 530 for facilitating authentication of the signal provided by RFID reader 315. Authentication circuitry 530 may be further in communication with a non-volatile secure memory database 535. Secure memory database 535 may comprise any suitable elementary file system such as that defined by ISO/IEC 7816-4 or any other elementary file system allowing a lookup of data to be interpreted by the application on the chip.

In addition, protocol/sequence controller 525 may be in communication with a database 540 for storing at least a transaction instrument 505 account data, and a unique transaction instrument 505 identification code. Protocol/sequence controller 525 may be configured to retrieve the account number from database 540 as desired. Database 540 may be of the same configuration as database 535 described above. The transaction instrument account data and/or unique transaction instrument identification code stored on database 540 may be encrypted prior to storage. Thus, where protocol/sequence controller 525 retrieves the account data, and or unique transaction instrument identification code from database 540, the account number may be encrypted when being provided to RFID reader 315.

The transaction instrument may be configured to respond to multiple interrogation frequency transmissions provided by RFID reader 315. That is, RFID reader 315 may provide more than one RF interrogation signal. In this case, transaction instrument 505 may be configured to respond to the multiple frequencies by including in the instrument one or more additional RF signal receiving/transmitting units 545. RF signal receiving/transmitting unit 545 may include an antenna 550 and a transponder 555 where both components are compatible with at least one of the additional RF signals provided by RFID reader 315. For example, in one exemplary embodiment, the transaction instrument 505 may include a 134 KHz antenna 550 configured to communicate with a 134 KHz transponder 555. In this exemplary configuration, an ISO/IEC 14443-2 compliant modulator/demodulator may not be required. Instead, the 134 KHz transponder may be configured to communicate directly with the protocol/sequence controller 525 for transmission and receipt of authentication and MT number signals as described above.

III. Process

FIG. 6 is a flowchart illustrating operation of the mass transit merchant payment system in accordance with one embodiment of the present invention. The process may begin with a customer establishing a transaction account associated with a financial transaction instrument linked to a mass transit fare card. Alternatively, the customer may already have an existing transaction account associated with a financial transaction instrument, but may wish to link their transaction instrument to a transit fare card. Initially, the customer may establish the transaction account by submitting a completed application to a transaction instrument issuer (step 605). The application may be a paper form mailed or sent by facsimile to the account issuer, a form transmitted to the account issuer over the Internet, or any other commonly-used method of transmitting applicant information to an account issuer.

A mass transit operator such as, for example, the Washington Metropolitan Area Transit Authority (WMATA), forwards to the transaction instrument issuer at least one mass transit identification number ("MT number"), either on an individual basis, for a particular applicant, or in batches of pre-approved numbers (step 610). The mass transit identification number or numbers may be provided, for example, electronically over a network, such as the Internet, or as an activated microprocessor inlay that contains an individual mass transit identification number (MT number), for incorporation into a financial transaction instrument such as a credit card.

Once the transaction instrument issuer receives a completed application from an applicant, it processes the application in order to determine whether the applicant is eligible for a financial transaction instrument (step 615). If approved, the transaction instrument issuer will proceed to establish a new transaction account. Once a new transaction account has been set up for the customer, the instrument issuer may link the financial transaction instrument with one of the newly available MT numbers it has received separately from the mass transit operator (step 620).

In an alternate embodiment, once the transaction instrument issuer has received, processed, and approved a new customer for a transaction account, it may create a file containing such information and forward it to a separate card issuance bureau for creating the tangible financial transaction instrument. In this embodiment, the mass transit operator likewise provides the separate vendor with a series of available MT numbers. The card issuance bureau provides an integrated financial transaction instrument that incorporates the MT number, such as, for example, a card or key chain fob. In either case, the transaction instrument is then forwarded to the customer (step 625).

The transaction instrument issuer also forwards to the mass transit operator both a list of MT numbers associated with active accounts, including newly-linked MT numbers, as well as a list of MT numbers associated with closed accounts (step 630). Such lists are provided on a regular schedule as, for example, on an hourly, daily or bi-weekly basis, in order to keep the database of the mass transit operator current. The list of active account MT numbers supplies the mass transit operator with the MT numbers that are now in circulation for customers with a new or existing financial transaction accounts that are in good standing. Separately, the transaction instrument issuer provides a list of MT numbers to the mass transit operator for which it has cancelled the funding source, i.e., the transaction account. The transaction account associated with the closed MT number may have been cancelled or temporarily suspended by the instrument issuer for a variety of reasons including, but not limited to, a recurring failure to pay by the account holder, fraudulent transactions, bankruptcy, and the like.

The mass transit operator stores the respective information from the two lists into its active account and closed account databases, as discussed above, including the closed account databases located in the gate readers or transit stations (step 635). For example, WMATA refreshes all of its gate readers throughout the entire transit system with the most current information on MT numbers that are no longer in service and/or associated with closed accounts. On average, such an update may take approximately 45 minutes for full system propagation of a 10,000-record closed account database. It should be noted that this estimated figure is intended merely as an exemplary illustration and in no way restricts the present invention.

In the meantime, as further illustrated in FIG. 6, the user receives their new financial transaction instrument linked to both a financial transaction account and MT number from either the transaction instrument issuer directly or from the card issuance bureau (step 640). As described earlier, the financial transaction instrument may be in the form of a transaction card, such as, for example, an ExpressPay™ credit card issued by American Express Company. In one embodiment, the card may comprise two separate electronic chips corresponding respectively to retail transactions and mass transit fare transactions. In another embodiment, the two electronic chips may be combined into a single electronic chip programmed to carry out both the retail transaction and mass transit fare functions and may also carry out the functions of a device into which it is integrated, e.g., the functionality of a cell phone as the transaction instrument.

Once the customer has received their linked financial transaction instrument, they may need to activate the financial transaction instrument before use (step 645). For example, the customer may telephone a number provided by the credit card company or log onto a particular webpage over a network to input the requested authorization information, such as the card number, a birthdate, password, and/or some other form of identification required to activate the transaction instrument. Alternatively, the mass transit function may simply be activated by its initial use within the mass transit system.

Optionally, the customer may wish to register their MT number with the mass transit operator. To do so, the customer approaches a card reader station located at the facility of the mass transit operator and inserts their new transaction instrument linked to an MT number into the card reader. As will later be described in greater detail, the MT number is recognized by the mass transit operator as corresponding to a specially-designated range of numbers distinct from conventional fare cards. The system of the mass transit operator then sends an authorization request to the transaction instrument issuer over a network such as the Internet. In this embodiment, the system 105 of the transaction instrument issuer then scans the mass transit database 120, and matches that number with the customer's transaction account information stored in the transactions database 115 via the transaction account server 110, to determine whether the particular MT number has ever been reported lost or stolen and to check that the customer associated with the MT number has sufficient credit. Once the instrument issuer returns an authorization message for the MT number to the mass transit operator, the card reader then writes on the card that the MT number has been registered. Such registration provides the basis for security, as a fraud prevention mechanism, as well as efficiency in restricting the amount of free MT numbers in circulation. The user can then proceed to enter the mass transit system.

FIG. 7 outlines the process for an exemplary use of the transaction device as a mass transit fare device. To activate the transaction instrument on the mass transit system, the customer simply waves their card or key chain fob over the gate reader within a range of about 10 cm (step 705). As a result of the radio frequency identification (RFID) technology used by the transaction instrument, the customer's MT number is transmitted to the RFID reader housed within the gate terminals, with mutual authentication, within milliseconds.

During interrogation, the gate reader recognizes specific information included as part of the MT number stored on an individual transaction instrument. This specific information is a designation of a range of MT numbers provided by the transit system operator to the transaction instrument issuer for operation on the mass transit system, and stored on the active accounts database. Each MT number in this range is individually correlated with one financial transaction instrument, linked to the user's financial transaction account. To illustrate, the MT number may comprise a four-digit alphanumeric combination stored on the financial transaction instrument or may contain a specially-designated subsequence of digits. As part of this identification, the first digit of this combination may be a specific letter that identifies the MT number as part of the range of MT numbers associated with financial transaction instruments collectively stored on the active accounts database 115 of the mass transit operator, in contrast to conventional fare cards issued by the mass transit operator. Recognition of this specific identifier by the system of the mass transit operator causes it to authorize entry and store information recording the transaction, rather than simply deducting the fare price as with conventional stored-value cards. It is understood that the above explanation is intended for illustrative purposes only, and does not limit the invention to any particular embodiment for the information included as part of the MT number.

At this time, the mass transit system verifies whether the customer's MT number is valid for entry (step 710). The reader circuitry compares the received mass transit number with the numbers stored in the database of closed numbers stored in the gate terminal, which, as discussed above, is periodically updated from the mass transit operator's centralized closed accounts database. If the customer's number does not correspond to one of the closed account numbers, then the customer is allowed entry through the transit gates or turnstiles (step 715). If, however, the gate terminal determines that the present customer's MT number matches a number on the closed accounts database, the gate terminal disables the transaction instrument (step 720), and the customer is then denied access into the mass transit system (step 725). Generally speaking, the list of closed accounts is much smaller than the list of active accounts and therefore is easier to store on individual gate terminals and easier to update periodically from a centralized database.

Alternatively, the gate terminal may store a list of active account MT numbers, and the customer's MT number may be checked to verify that it is on the list of active MT numbers, which is also provided by the instrument issuer. This list may be stored in the gate terminal and periodically updated from a centralized database, or alternatively, may be stored in a local database, e.g., a server located at the mass transit station that is connected to the gate terminals by a network. When the gate terminal determines that the present customer's mass transit number is active, the customer is allowed entry into the mass transit system. Such active number lookup, however, is an optional step, allowing the mass transit operator to maintain additional information on which MT numbers are active as well as which are closed.

When the user is allowed access, the gate terminal circuitry transmits a record of the transaction over a network to the mass transit operator's transactions database for subsequent storage. In the present invention, therefore, the mass transit operator is treated as a "merchant", providing transportation services. As such, the gate terminal at any station is treated as the point-of-sale location at which transactions are conducted. As the customer passes through the gate terminal, the system indicates there is sufficient fare on the customer's transaction instrument. In contrast to conventional transit fare cards, which are typically stored-value cards from which a fare is deducted, the transaction instrument in the present invention is always "full," because the customer is billed as with any other retail credit card purchase, namely, at the close of a billing period. Consequently, the user receives the benefit of always being able to ride a mass transit system without ever needing to refill their payment device, provided of course that their MT number has not been listed as closed by the transaction instrument issuer.

For each ride, the mass transit operator records the "transaction" corresponding to the customer's MT number and does so over a fixed billing period, for example, one week or one month (step 730). These transactions are stored in the transactions database of the mass transit operator, over the course of the billing period, to be consolidated into a single transaction to be submitted to the transaction instrument issuer at the end of the billing period.

Furthermore, the present invention may be implemented with any conventional mass transit environment, whether it be a flat fee per ride as used, for instance, by the New York City and Chicago Transit Authorities or, otherwise, a fare based on a distance traveled and time-of-day as is the case with the Washington Metropolitan Area Transit Authority. This is because it is possible for the mass transit operator to record and store the "transaction" in a number of ways. Regardless of the particular fare schedule, each transaction made using the transaction instrument is recorded and stored by the particular mass transit operator.

More precisely, in a first embodiment, the mass transit operator may record each entry and exit of a user with an MT number while also calculating the fare amount due for each use of the mass transit system as it occurs. In this embodiment, the number of entries and exits is recorded contemporaneously with the fare calculation for each use.

Alternatively, the mass transit operator may record each entry and exit for a particular MT number over a set period of time, thereby maintaining a running tally of use on its system. At the end of the time period, the mass transit operator then calculates the total amount due at its facility. This deferred calculation of the total fares due is most routinely used under the present invention.

Further still, the mass transit operator may record a particular user's number of entries and exits over a period of time, and subsequently forward this total, along with its standard payment schedule, to the financial instrument issuer for calculation of the amount due. In such embodiment, the instrument issuer such as American Express then calculates the total price owed the mass transit operator after receiving the number of "transactions" and fare schedule over a network.

At the same time, for mass transit systems that charge a flat fee per ride, the mass transit operator records only the entry of an MT number onto its subways or busses, but may then calculate the fare(s) due according to any one of the foregoing methods.

Each instance in which a customer rides a particular mode of transportation (or even uses a parking facility of the transit operator) along the mass transit system, including a subway, bus, train and the like, constitutes a "transaction" that is recorded on the database of the mass transit operator. Because, for the various reasons discussed above, processing a complete credit card authorization for each ride is impractical, in the present invention the total fare for the rides in a billing cycle is instead aggregated by the mass transit operator into a single "transaction" for subsequent settlement with the transition instrument issuer.

Specifically, upon either entry of or exit from a mass transit system, rather than performing a credit card authorization at that very instance, the gate terminal receives the MT number of the user via the radio frequency communication with the card or key chain fob. At this time, the gate terminal circuitry records the "transaction" as data, which is then forwarded over a network to the transactions database of the mass transit operator for storage.

Once the total fare in the billing period for a given MT number has been aggregated into a single transaction (step 735), the transaction must then be processed in order for the mass transit operator to receive payment. Authorization is necessary because the payment of the total fee amount is conducted as any conventional credit card transaction after the mass transit operator has aggregated all of the individual fees incurred within a billing cycle. The financial transaction aspect of the present invention permits the user to conduct such "transaction" for each ride on a mass transit system, and then defer payment for the individual trips until the close of the billing period. In this way, the present invention functions much like a regular credit card purchase of various items from a single retail merchant. However, unlike conventional in-store or online credit card purchases, the processing and authorization for all of the rides occurs at the end of the billing period, rather than contemporaneous with the actual purchase. Under the present invention, a number of processes are available for settling the transaction (step 740).

In a preferred embodiment, the mass transit operator obtains settlement by requesting the transaction account number (i.e., credit card number) associated with a given MT number, in order to have the transaction processed. This process is outlined in FIG. 8. The transit accounts system of a mass transit operator only stores MT numbers for tracking and recording rider usage and fares. Therefore, the mass transit operator requests the transaction account number associated with the MT number by contacting the transaction instrument issuer over a network, including perhaps, the Internet, (depicted as element 175 in FIG. 1) to initiate settlement (step 810). Once the instrument issuer receives the request, the transaction accounts server at the instrument issuer facility matches the submitted MT number with the corresponding transaction account number stored in the transaction accounts database (step 815). This matching may be accomplished automatically by the transaction accounts server 110. In either case, the MT number in question is referenced against the account database to retrieve the corresponding transaction account number.

When the MT number has been matched by the instrument issuer with the transaction account number for the transaction instrument (e.g., the credit card number), this information is forwarded by the issuer, over the secure network, back to the mass transit operator (step 820). Then, as with any conventional credit card processing operation, the mass transit operator may append the amount of the "transaction", along with their merchant ID to the received transaction account number, and send this data to either an acquirer or directly to the issuer over a secure "payment network" (depicted as element 140 in FIG. 1), for authorization and settlement (step 825). This payment network may be any dedicated, proprietary network known in the art including, for example, the American Express® Network, specifically configured to accommodate transactions for credit cards and other types of financial/banking cards over a secure channel. The transmitting of the information from the mass transit operator to the acquirer or issuer may be accomplished in accordance with any conventional method for completing a transaction using network data transmission.

Figure 8A:
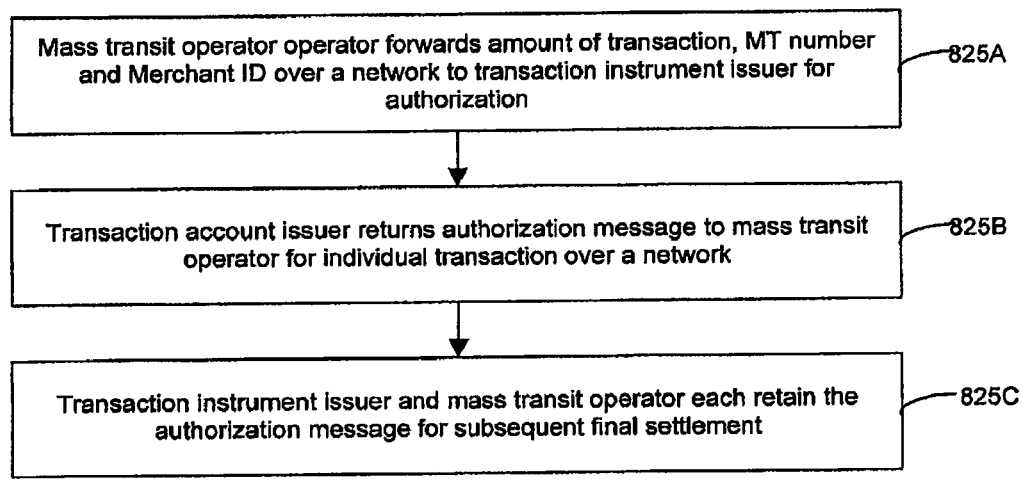
FIG. 8A is a flowchart outlining the optional step of authorizing individual transactions prior to settlement in accordance with one embodiment of the present invention.

As with any conventional credit card transaction, payment of the mass transit fees may include initial authorization, as outlined in FIG. 8A. For instance, when the user takes a ride on the subway using their financial transaction instrument, the mass transit operator, acting as a merchant, will forward the amount of the ride, say $1.50, along with the customer's MT number and their merchant ID to the transaction instrument issuer for authorization (step 825A). This may be done on a daily, weekly, or monthly schedule. The transaction instrument issuer may then return a responsive authorization code or message to the mass transit operator, authorizing each of the customer's individual transactions (step 825B). The individual authorizations are then stored by the mass transit operator over a set period of time, to be aggregated at the close of such period for final settlement. The authorization of individual transactions also allows the transaction instrument issuer to maintain a catalogue or tallied series of each separate "purchase" (that is, use of a service provided by the mass transit operator), so that once the purchases are subsequently aggregated into a single "transaction" on the user's statement, the user is able to dispute any individual charge for which they have been billed (step 825C). This, in turn, satisfies all regulatory requirements that transaction instrument issuers allow cardmembers the opportunity to dispute each individual purchase. It is understood that the foregoing process for authorization may be included as part of any method for settlement described herein.

Returning to FIG. 8, at the end of a specified period of time (e.g., a day, week or month), the individual authorizations are aggregated by the mass transit operator for a particular MT number, and are forwarded to the transaction instrument issuer as a settlement request for the total aggregated amount (step 830). As an additional safeguard, the transaction instrument issuer may optionally request that the individual authorization messages be sent along with the settlement request. The transaction instrument issuer will then credit the mass transit operator the total aggregated amount due thereby allowing funds to be disbursed, and subsequently bill the user for the money owed by issuing a statement to the customer for the amount due (step 835).

Alternatively, however, in the system of the present invention final payment of the mass transit fees need not require individual authorization messages by the transaction instrument issuer. In such embodiment, the mass transit operator simply aggregates the individual uses of its service(s) by a customer over a fixed period of time, and submits the aggregated amount, together with the customer's MT number and their merchant ID, to the transaction instrument issuer for settlement. Regardless of whether individual authorization occurs, after the transit operator receives payment (step 835), the issuer bills the account holder at the end of the billing period (step 840).

Using the current embodiment, the mass transit operator does not store on any of its databases the transaction account numbers of individual riders. Therefore, sensitive information cannot be stolen from the mass transit operator, which thus provides a significant security measure for protecting customers with linked transaction instruments. By keeping users' transaction account numbers as a transient data flow, the present invention affords secured payment settlement in today's age of frequent identity theft and credit card fraud.

Alternatively, in another embodiment of the present invention, the mass transit operator obtains payment by submitting an encrypted secondary account number for authentication by the issuer along with every settlement request, as depicted in FIG. 9. Under this embodiment, the instrument issuer initially provides the mass transit operator with a secondary account number associated with the user's financial transaction account. The secondary account number is in a special range of numbers that requires authentication for payment requests to be processed by the instrument issuer. The mass transit operator then associates this secondary number with the user's MT number. When issuing a payment request, this secondary account number is then encrypted with a digital signature identifying the mass transit operator and validating their authenticity as a merchant (step 905). The digital signature may be any conventional encryption technique including, for example, a system of symmetric or public/private encryption keys for authenticating the sender of the payment request.

At the close of a billing period, the mass transit operator aggregates the fares and fees associated with an MT number into a single transaction, calculates a total amount due, and submits this information together with the secondary account number and their digital signature to the instrument issuer. The data may be forwarded over any conventional payment network linking the mass transit operator to the instrument issuer (step 910). To illustrate, the mass transit operator may use its own private electronic key to encrypt the payment request with its digital signature.

When the issuer receives the data, it proceeds to authenticate the digital signature associated with the payment request (step 915). An operator at the facility of the instrument issuer may decrypt the digital signature using, for instance, the public key for the mass transit operator. The digital signature is authenticated as originating from the mass transit operator because only that operator could have encrypted the data with its private key. Of course, the foregoing example is intended only to illustrate one possible method for encryption as used in the present embodiment, and therefore does not limit the present invention. Indeed, numerous other methods for supplying a digital signature may be utilized herein. In this way, if the secondary account number is somehow stolen during transmission, any fraudulent payment request will not be accompanied by the necessary cryptographic data, i.e., digital signature, so as to authenticate the request. Hence, the issuer will refuse to authorize any payment request without a proper digital signature.

As further shown in FIG. 9, the instrument issuer may then match the secondary account number with the transaction account number of the user once it has verified the identity of the mass transit operator by decrypting the digital signature of the payment request (step 920). To accomplish the matching, the transaction accounts server at the facility of the instrument issuer may reference the secondary number against the data stored in its system to arrive at the corresponding transaction account.

Following authentication of the source of the payment request and matching of the secondary transaction account number cryptographic data with the user's transaction account, authorization and settlement may proceed as earlier described (step 925). Once the settlement request is received, the issuer credits the account of the mass transit operator for the amount due (step 930), thus completing merchant payment. The payment amount for the entire transaction then appears on the user's periodic statement from the issuer (step 935).

FIG. 10 presents yet another embodiment of the present invention, wherein settlement of the transaction is accomplished almost exclusively at the transaction instrument issuer's end. Following aggregation of the fares and fees at the close of a billing cycle, the mass transit operator appends their merchant ID along with the total amount owed to a given MT number, and transmits this information over a network (depicted as element 175 in FIG. 2) to the transaction instrument issuer (step 1005). The data may be encrypted by any conventional algorithm or other security device for the protection of data during transmission that is known in the art.

When the instrument issuer receives the MT number with the amount owed and merchant ID, the issuer proceeds to match this data with a transaction account stored on its system (step 1010). As soon as the corresponding transaction account number is located from the accounts database, the issuer may authorize and process the transaction according to any conventional method for conducting a financial card transaction (step 1015). For instance, the transaction instrument issuer will determine whether the transaction account number is valid and whether to approve or decline the transaction by determining whether the account holder has sufficient credit to cover the cost of the total transaction at a financial institution (i.e., the user's bank). Again, once the settlement request is received, the financial institution authorizes a transfer of money to the transaction instrument issuer (step 1020). The instrument issuer, in turn, credits the account of the mass transit operator for the amount due (step 1025).

In this third embodiment, the mass transit operator again does not store any transaction account numbers that are linked with its MT numbers. Instead, all information pertaining to the transaction account remains with the transaction instrument issuer, less accessible to potential theft. Therefore, settlement of the transaction in the present invention does not involve use of a customer's sensitive financial data by the mass transit operator.

The foregoing methods for payment settlement under the present invention are merely illustrative of preferred processes for settlement of the transaction price between the mass transit operator and instrument issuer and, hence, do not limit the invention to only these methods for processing payment. Indeed, numerous methods for settlement of the transaction may be available for use with the present invention.

Figure 11:
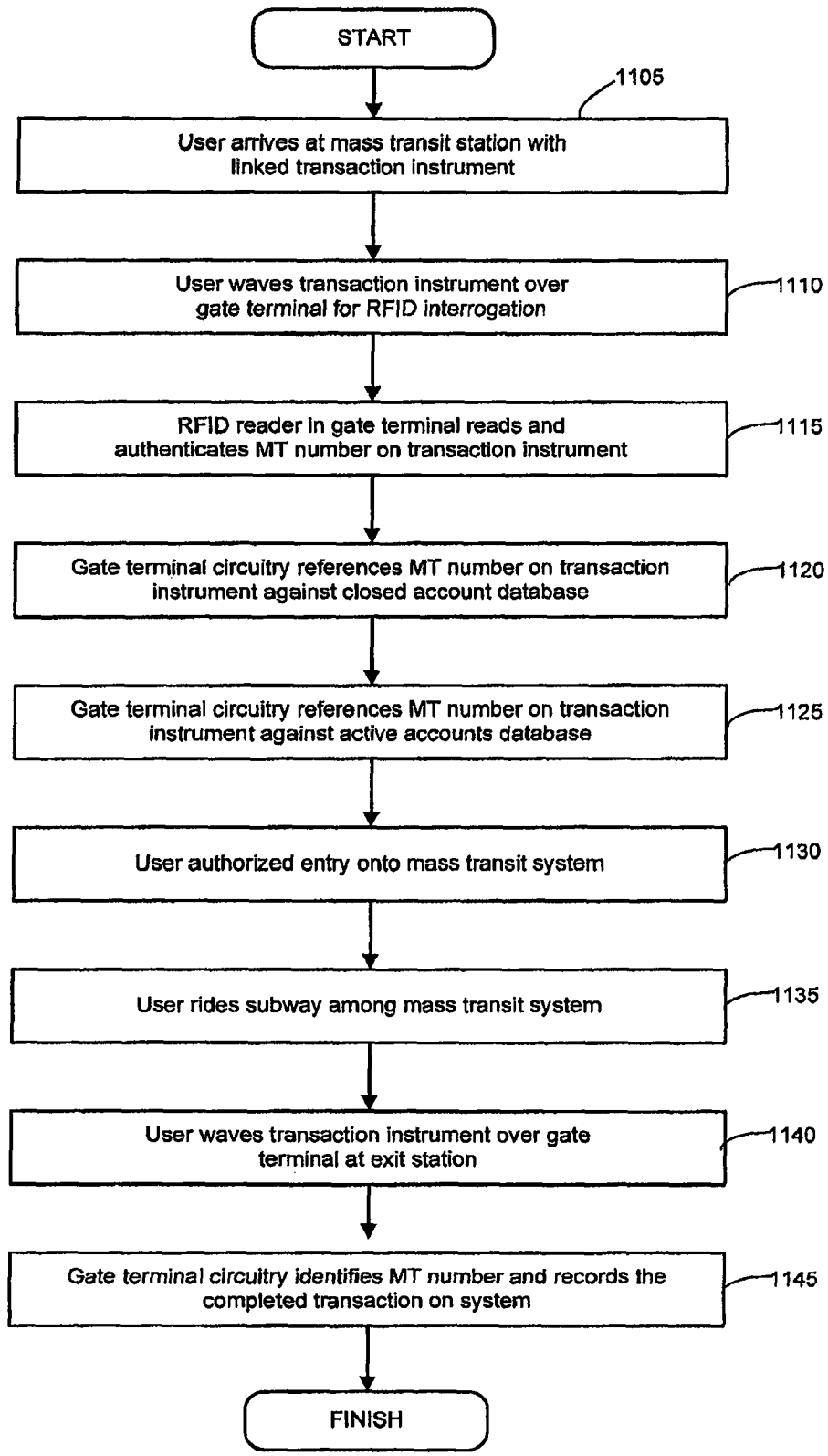
FIG. 11 is a flowchart outlining an exemplary transaction on a mass transit system using the transaction instrument in accordance with one embodiment of the present invention.

FIG. 11 shows an example of how a user conducts a transaction using the transaction instrument to pay for mass transit fares. The customer first establishes a transaction account with the account issuer and requests that their transaction instrument be linked with the mass transit function as described above, or the user may have previously opened a transaction account and now wishes to use the account to pay for mass transit. In this particular example, the user already has an activated transaction instrument for retail purchases and proceeds to use their instrument to ride a subway. The user arrives at a station of the mass transit system (step 1105), say, the Foggy Bottom-GWU station along the blue and orange routes of the Washington Metropolitan Area Transit Authority (WMATA). As the customer approaches the gate terminal, they wave their transaction instrument (e.g., ExpressPay™ Card with incorporated MT number) over the gate reader (step 1110) to effectuate interrogation via the radio frequency exchange between the transponder in the device and the RFID reader within the gate terminal (step 1115).

The internal circuitry of the gate terminal references the user's MT number, received by the radio frequency, against the closed MT numbers stored in the closed account database (element 160 in FIG. 3) within the gate terminal (step 1120). Optionally, the internal circuitry of the gate terminal may likewise reference an active accounts database to determine whether the user's MT number is stored therein (step 1125). Assuming the user's MT number is not on the list of closed MT numbers received from the issuer (e.g., the American Express Company), the circuitry of the gate reader will open the gate. The user passes then through the terminal and boards the subway (step 1130) for their ride on the WMATA mass transit system (step 1135).

Upon arrival at their destination, perhaps the Crystal City station, the user approaches the gate terminals and again waves their transaction instrument over the reader (step 1140). At this time, the mass transit fare "transaction" is completed with the circuitry at the gate terminal authenticating the presented MT number (step 1145), transmitted via radio frequency, and opening the gates to permit the user to exit the station. Simultaneously, a processor as part of WMATA's system performs a calculation for the fare owed based on the distance traveled by the user. To illustrate, such fare may amount to $2.65. A record of the ride corresponding to the user's MT number is stored on WMATA's transactions database, along with the fare amount for subsequent aggregation.

Meanwhile, the user exits the Crystal City station without the inconvenience of either waiting for processing of the credit card transaction for that particular ride or having to remember how much value is left on their transaction instrument. At the end of the month, the total fare from all rides, as well as any other mass transit fees, such as parking fees, will appear as a single transaction from WMATA as the merchant on the customer's credit card statement.

IV. Example Implementations

The present invention (i.e., system 105, process 700 or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 12:
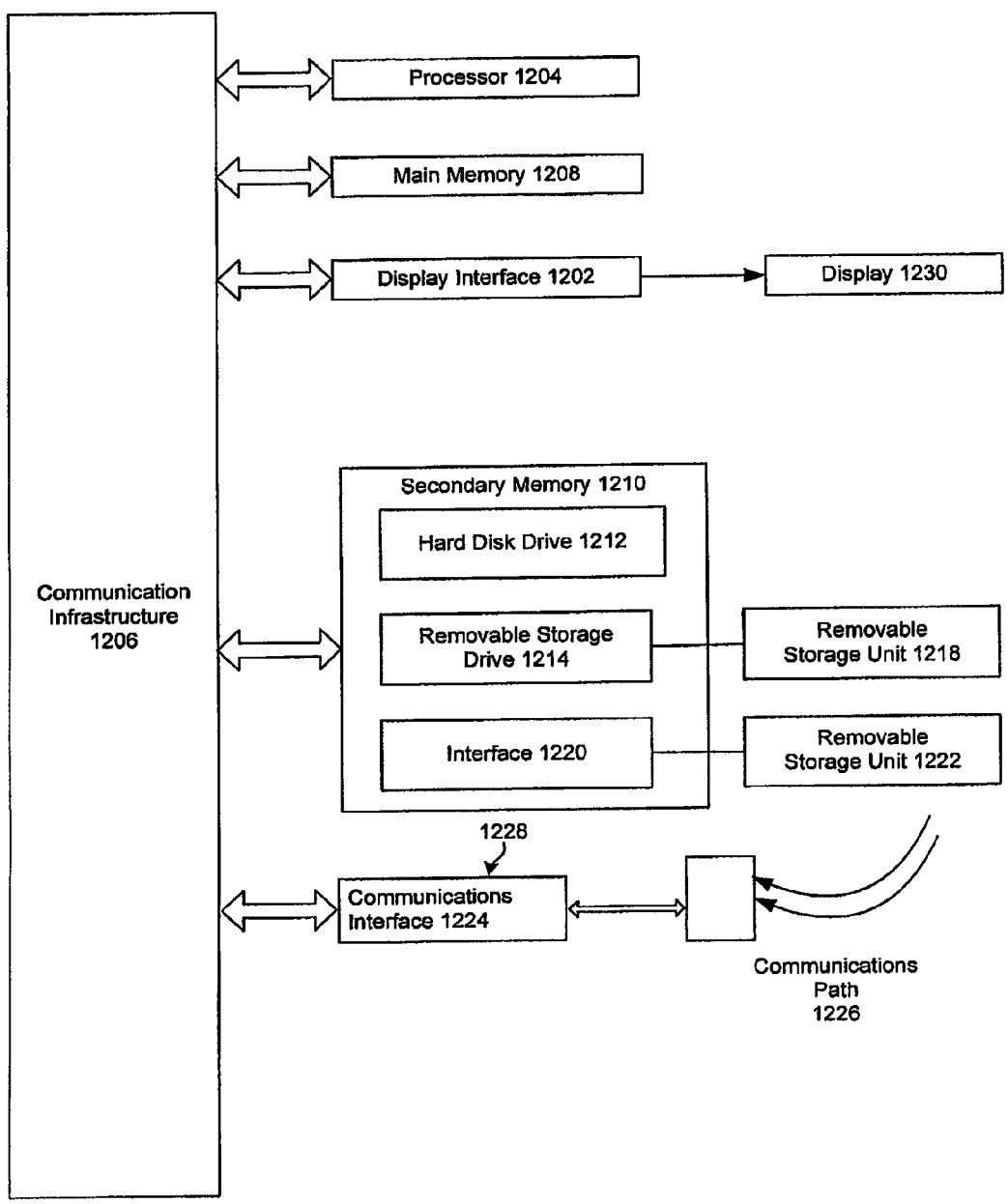
FIG. 12 is a block diagram of an exemplary computer system useful for implementing the present invention.

In fact, in one embodiment, the invention is directed toward one or more computer systems capable of carrying out the functionality described herein. An example of a computer system 1200 is shown in FIG. 12.

The computer system 1200 includes one or more processors, such as processor 1204. The processor 1204 is connected to a communication infrastructure 1206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1200 can include a display interface 1202 that forwards graphics, text, and other data from the communication infrastructure 1206 (or from a frame buffer not shown) for display on the display unit 1230.

Computer system 1200 also includes a main memory 1208, preferably random access memory (RAM), and may also include a secondary memory 1210. The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well-known manner. Removable storage unit 1218 represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 may include other similar devices for allowing computer programs or other instructions to be loaded into computer system 1200. Such devices may include, for example, a removable storage unit 1222 and an interface 1220. Examples of such may include a program cartridge and cartridge interface (such as that found in video game devices), a removable memory chip (such as an erasable programmable read only memory (EPROM), or programmable read only memory (PROM)) and associated socket, and other removable storage units 1222 and interfaces 1220, which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a Personal Computer Memory Card International Association (PCMCIA) slot and card, etc. Software and data transferred via communications interface 1224 are in the form of signals 1228 which may be electronic, electromagnetic, optical or other signals capable of being received by communications interface 1224. These signals 1228 are provided to communications interface 1224 via a communications path (e.g., channel) 1226. This channel 1226 carries signals 1228 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1214, a hard disk installed in hard disk drive 1212, and signals 1228. These computer program products provide software to computer system 1200. The invention is directed to such computer program products.

Computer programs (also referred to as computer control logic) are stored in main memory 1208 and/or secondary memory 1210. Computer programs may also be received via communications interface 1224. Such computer programs, when executed, enable the computer system 1200 to perform the features of the present invention, as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method, comprising:
    receiving, by a computer based system for payment processing, a request for payment of a transit system entry fee, wherein the payment is from a financial transaction account;
    receiving, by the computer based system, an identification code, wherein the identification code is associated with the transit system entry fee;
    associating, by the computer based system, the identification code with a transaction account code, wherein the transaction account code is associated with the financial transaction account, and wherein the identification code is distinct from the transaction account code; and
    settling, by the computer based system, the request for payment of the transit system entry fee.

2. The method of claim 1, wherein the transit system fee is registered for use on the transit system.

3. The method of claim 1, further comprising aggregating a plurality of the transit system fees associated with the identification code and incurred from use of the financial transaction instrument, to obtain aggregate transit system fees.

4. The method of claim 3, further comprising settling payment for the aggregate transit system fees.

5. The method of claim 1, further comprising recording the transit system fees associated with the same identification code for each use of the transit system.

6. The method of claim 1, wherein the identification code is created by a mass transit operator and is associated with a mass transit account.

7. The method of claim 1, wherein an authorization message for the transit system fee is obtained prior to requesting payment for the transit system fee.

8. The method of claim 1, wherein the secondary transaction account code is encrypted with a digital signature.

9. The method of claim 1, wherein the identification code is associated with a designation of a range of Mass Transit codes, each constituting a separate identification and provided by a transit system operator.

10. The method of claim 1, wherein a plurality of transit system fees are registered over a period of time and aggregated into a single financial transaction.

11. The method of claim 1, wherein a plurality of transit system fees are registered over a period of time and are tallied as a series of individual transactions prior to aggregation into a single transaction.

12. The method of claim 1, wherein the transaction account code associated with the financial transaction account is not stored on the transit system.

13. The method of claim 1, wherein the identification code permits entry into the transit system by being interrogated and recognized by radio frequency identification (RFID).

14. The method of claim 1, wherein the identification code permits entry into the transit system by being received from a magnetic stripe reader.

15. The method of claim 1, wherein the identification code permits entry into the transit system by being received from a smart card reader.

16. The method of claim 1, wherein the identification code is distinct from a transaction account code associated with the financial transaction account.

17. The method of claim 1, wherein the identification code is derived from a transaction account code associated with the financial transaction account.

18. A system comprising:
a non-transitory memory communicating with a processor for payment processing, the non transitory memory having instructions stored thereon that, in response to execution by the processor, cause the processor to perform operations comprising:
receiving, by the processor, a request for payment of a transit system entry fee, wherein the payment is from a financial transaction account;
receiving, by the processor, an identification code, wherein the identification code is associated with the transit system entry fee;
associating, by the processor, the identification code with a transaction account code, wherein the transaction account code is associated with the financial transaction account, and wherein the identification code is distinct from the transaction account code; and
settling, by the processor, the request for payment of the transit system entry fee.

19. A non-transitory, tangible computer readable storage medium having stored thereon computer executable instructions that, if executed by a computer based system for payment processing, cause the computer based system to perform operations comprising:
receiving, by the computer based system, a request for payment of a transit system entry fee, wherein the payment is from a financial transaction account;
receiving, by the computer based system, an identification code, wherein the identification code is associated with the transit system entry fee;
associating, by the computer based system, the identification code with a transaction account code, wherein the transaction account code is associated with the financial transaction account, and wherein the identification code is distinct from the transaction account code; and
settling, by the computer based system, the request for payment of the transit system entry fee.

\* \* \* \* \*